(12) United States Patent
Rapaport et al.

(10) Patent No.: US 8,394,221 B2
(45) Date of Patent: Mar. 12, 2013

(54) METHOD OF MAKING CHAMBER WITH TENSILE MEMBER

(75) Inventors: Zvi Rapaport, Portland, OR (US); Darren C. Davison, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/460,710

(22) Filed: Apr. 30, 2012

(65) Prior Publication Data

US 2012/0211147 A1 Aug. 23, 2012

Related U.S. Application Data

(62) Division of application No. 12/123,646, filed on May 20, 2008.

(51) Int. Cl.
*B32B 37/10* (2006.01)
*A43D 29/00* (2006.01)

(52) U.S. Cl. .................. 156/145; 156/275.1; 156/308.2; 156/308.4; 156/309.6; 36/29; 12/146 R

(58) Field of Classification Search ............... 36/28–29; 12/16.2–16.4, 42 R, 147 R–147 B, 146 R; 264/222; 156/145–147, 275.1, 308.2, 308.4, 156/580–583.91
See application file for complete search history.

(56) References Cited

U.S. PATENT DOCUMENTS

| | | |
|---|---|---|
| 3,253,355 A | 5/1966 | Menken |
| 3,984,926 A | 10/1976 | Calderon |
| 4,025,974 A | 5/1977 | Lea et al. |
| 4,219,945 A | 9/1980 | Rudy |
| 4,287,250 A | 9/1981 | Rudy |
| 4,513,449 A | 4/1985 | Donzis |
| 4,619,055 A | 10/1986 | Davidson |
| 4,874,640 A | 10/1989 | Donzis |
| 4,906,502 A | 3/1990 | Rudy |
| 5,083,361 A * | 1/1992 | Rudy ............................ 29/454 |
| 5,134,790 A | 8/1992 | Woitschaetzke et al. |
| 5,369,896 A | 12/1994 | Frachey et al. |
| 5,543,194 A | 8/1996 | Rudy |
| 5,552,205 A | 9/1996 | Lea |
| 5,572,804 A | 11/1996 | Skaja et al. |
| 5,630,237 A | 5/1997 | Ku |

(Continued)

FOREIGN PATENT DOCUMENTS

| | | |
|---|---|---|
| CN | 102026558 | 4/2011 |
| EP | 2303054 | 4/2011 |

(Continued)

OTHER PUBLICATIONS

International Search Report and Written Opinion for PCT/US2009/044086, mailed on Nov. 20, 2009.

(Continued)

*Primary Examiner* — Katarzyna Wyrozebski Lee
*Assistant Examiner* — Scott W Dodds
(74) *Attorney, Agent, or Firm* — Plumsea Law Group, LLC

(57) ABSTRACT

A fluid-filled may include including an outer barrier, a tensile member, and a fluid. The tensile member may be located within barrier and formed from a textile element that includes a pair of spaced layers joined by a plurality of connecting members. A method of manufacturing the chamber may include locating a textile tensile member between two polymer elements. Pressure and heat are applied to the tensile member and the polymer elements in a first area and in a second area. The pressure is greater in the first area than in the second area. In addition, the polymer elements are bonded together around a periphery of the tensile member.

9 Claims, 30 Drawing Sheets

U.S. PATENT DOCUMENTS

| | | | |
|---|---|---|---|
| 5,741,568 | A | 4/1998 | Rudy |
| 5,802,739 | A | 9/1998 | Potter et al. |
| 5,918,383 | A | 7/1999 | Chee |
| 5,987,781 | A | 11/1999 | Pavesi et al. |
| 5,993,585 | A | 11/1999 | Goodwin et al. |
| 6,029,962 | A | 2/2000 | Shorten et al. |
| 6,041,521 | A | 3/2000 | Wong |
| 6,098,313 | A | 8/2000 | Skaja |
| 6,119,371 | A * | 9/2000 | Goodwin et al. ........ 36/29 |
| 6,127,010 | A | 10/2000 | Rudy |
| 6,385,864 | B1 | 5/2002 | Sell, Jr. et al. |
| 6,837,951 | B2 | 1/2005 | Rapaport |
| 7,131,218 | B2 | 11/2006 | Schindler |
| 2002/0121031 | A1 | 9/2002 | Smith et al. |
| 2003/0097767 | A1 | 5/2003 | Perkinson |
| 2003/0098118 | A1 * | 5/2003 | Rapaport ........ 156/221 |
| 2005/0039346 | A1 | 2/2005 | Thomas et al. |
| 2005/0097777 | A1 | 5/2005 | Goodwin |
| 2005/0183287 | A1 | 8/2005 | Schindler |
| 2007/0169379 | A1 | 7/2007 | Hazenberg et al. |
| 2009/0288313 | A1 | 11/2009 | Rapaport et al. |

FOREIGN PATENT DOCUMENTS

| | | |
|---|---|---|
| WO | 2009143002 | 11/2009 |

OTHER PUBLICATIONS

Chinese Office Action issued Sep. 27, 2011 in Chinese Application No. 200980116935.3 and English-Language Translation.

International Preliminary Report on Patentability (including Written Opinion of the ISA) mailed Dec. 2, 2012 in International Application No. PCT/US2009/044086.

Response to Chinese Office Action filed Feb. 13, 2012 in Chinese Application No. 200980116935.3 and English-Language Translation.

Notification of Grant dated Mar. 1, 2012 in Chinese Application No. 200980116935.3 and English-Language Translation.

U.S. Appl. No. 13/460,739, filed Apr. 30, 2012.

Preliminary Amendment filed Apr. 30, 2012 in U.S. Appl. No. 13/460,739.

Notice of Allowance mailed Jul. 5, 2012 in U.S. Appl. No. 13/460,739.

* cited by examiner

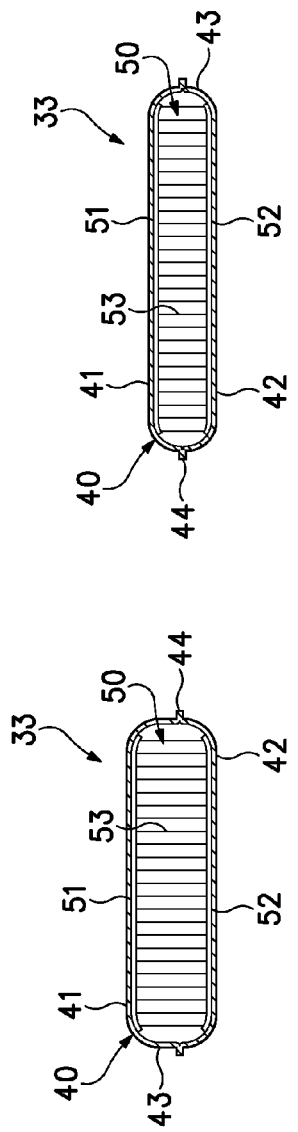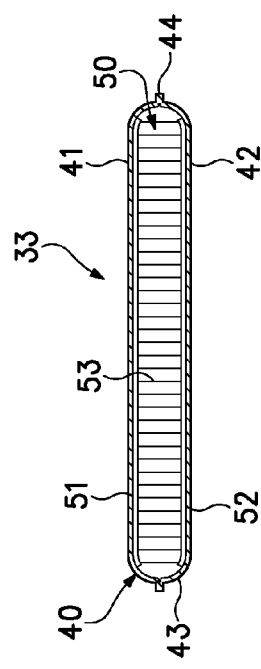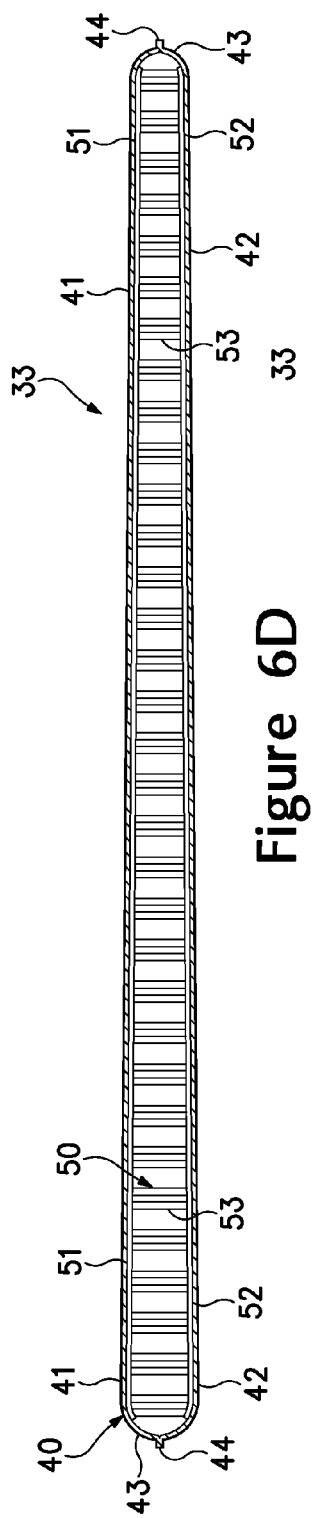

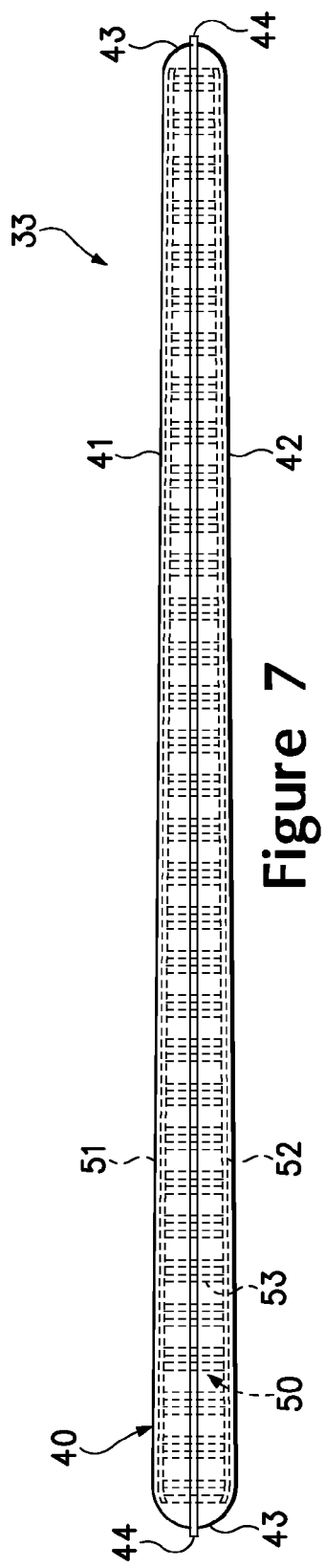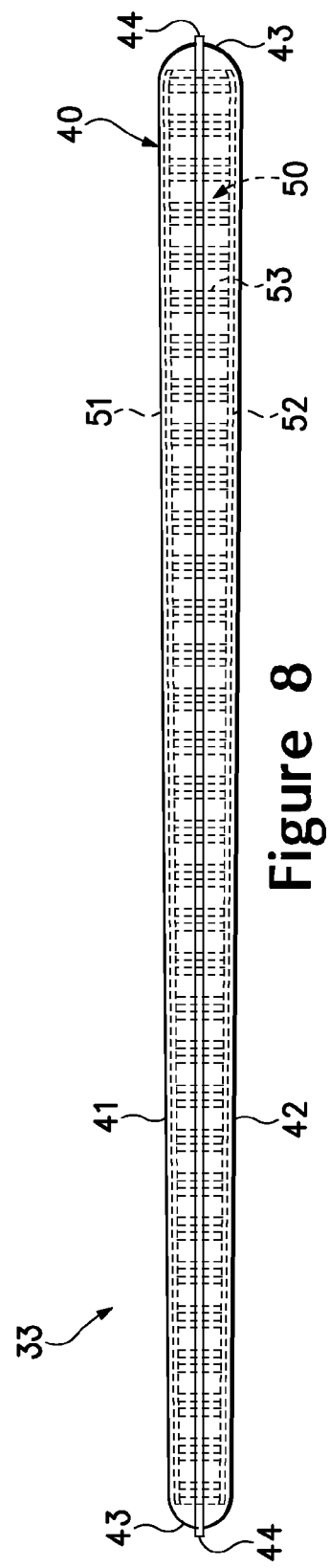

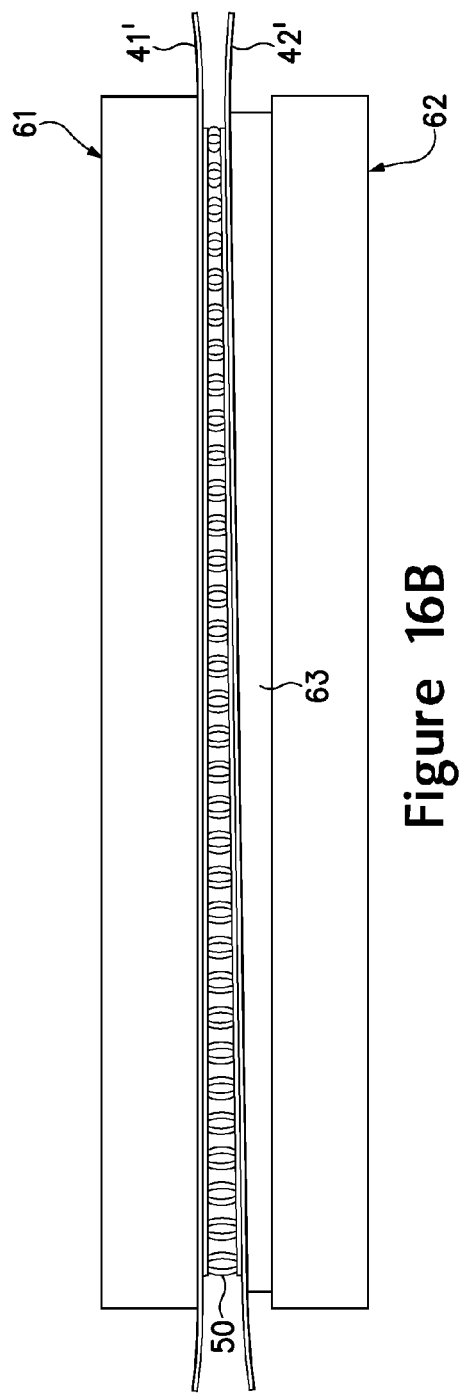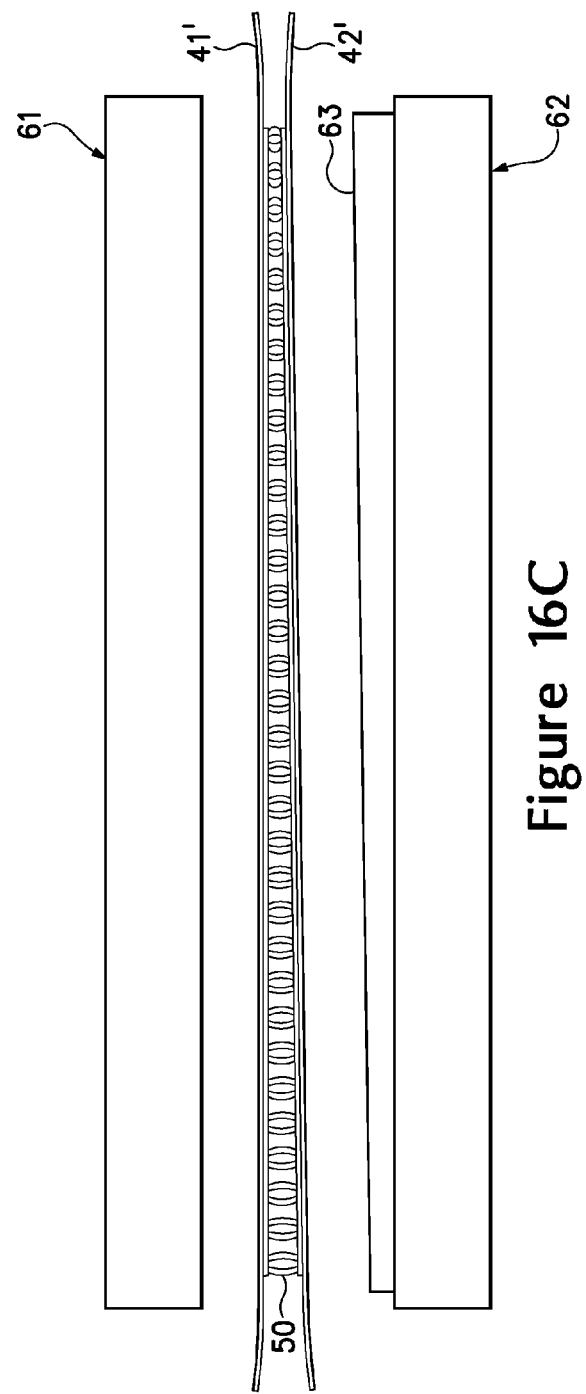

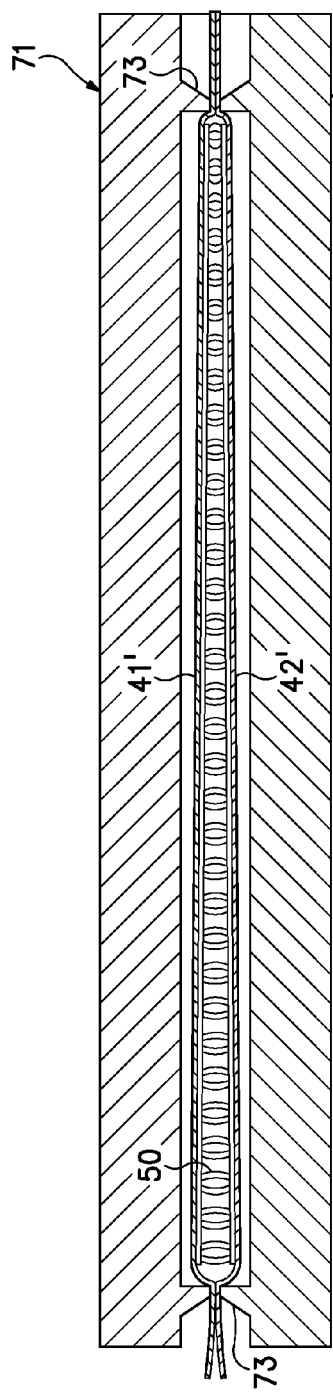
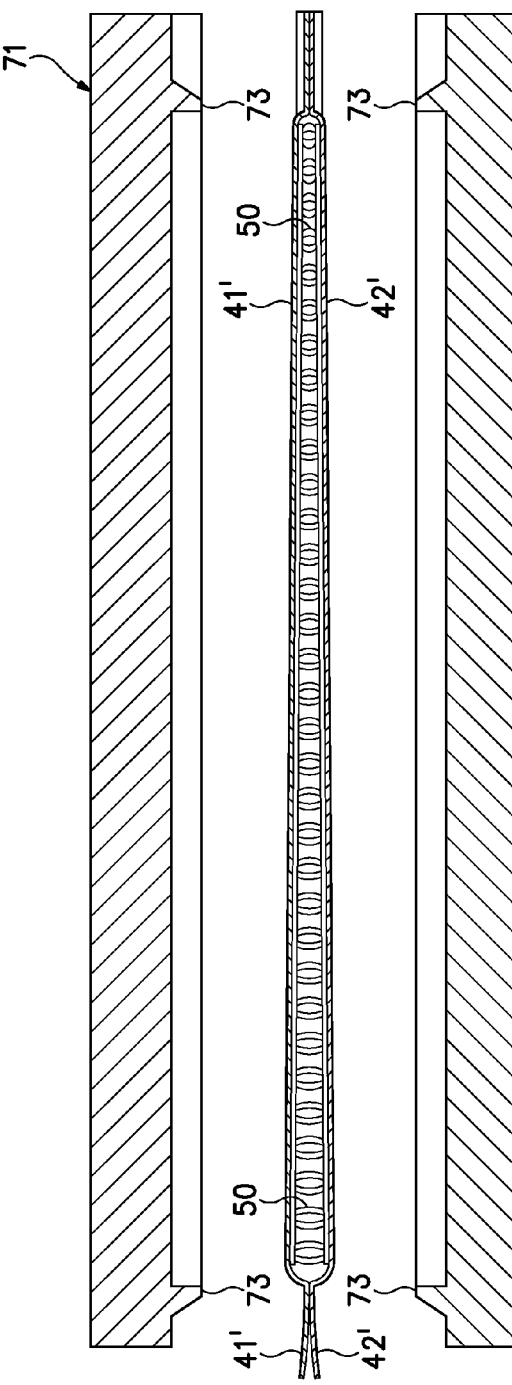

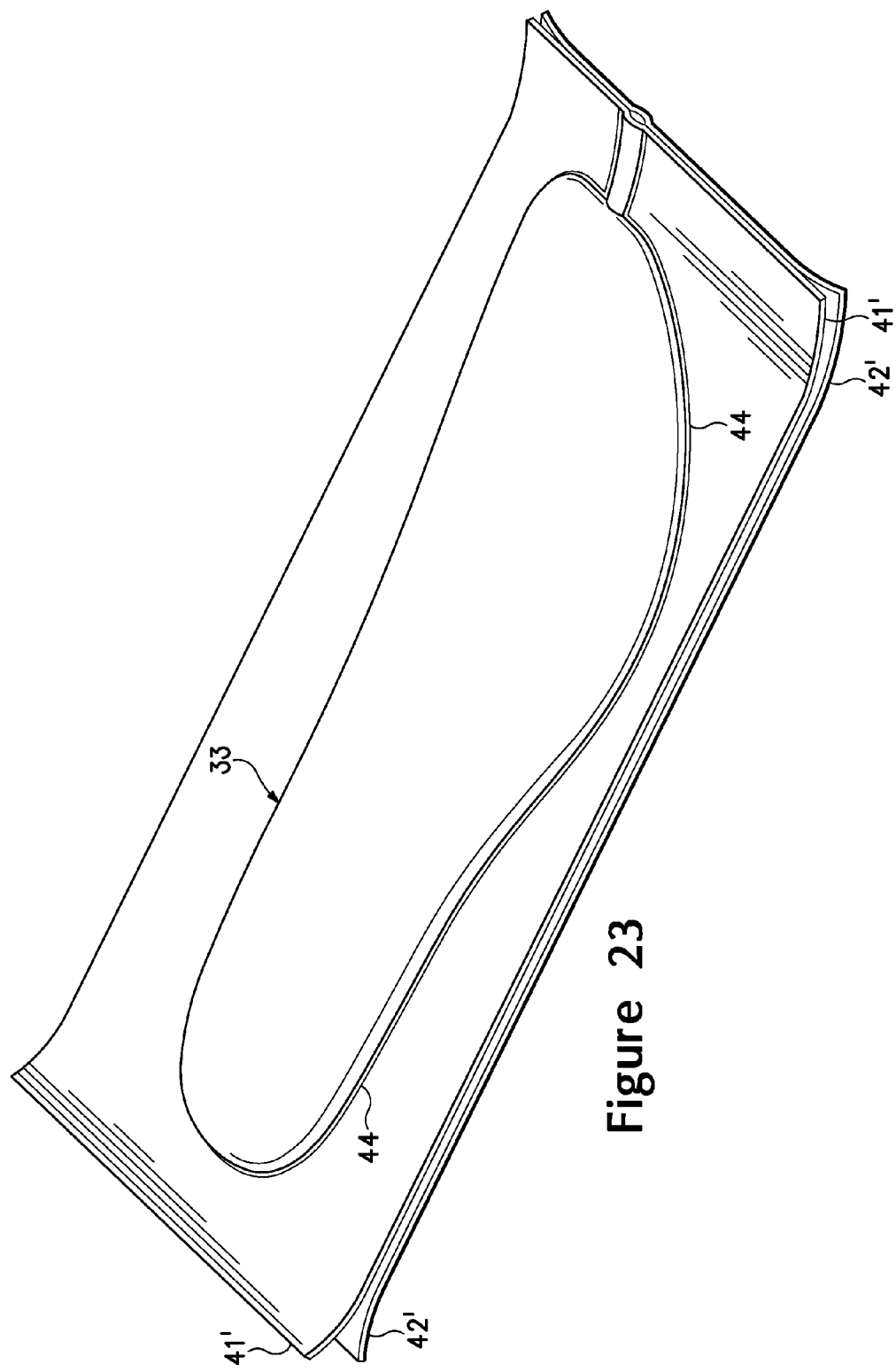

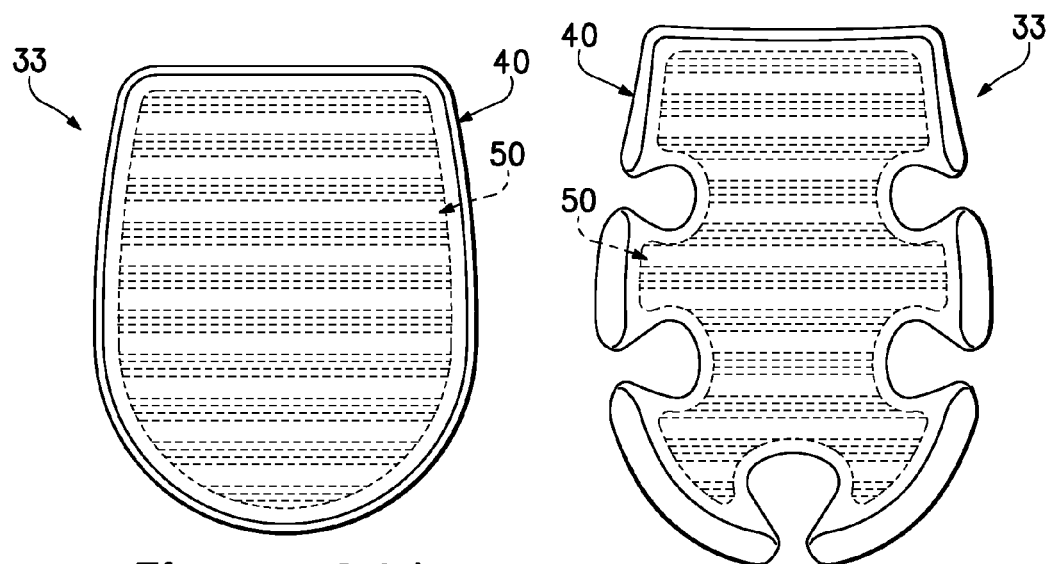
Figure 24A
Figure 24C
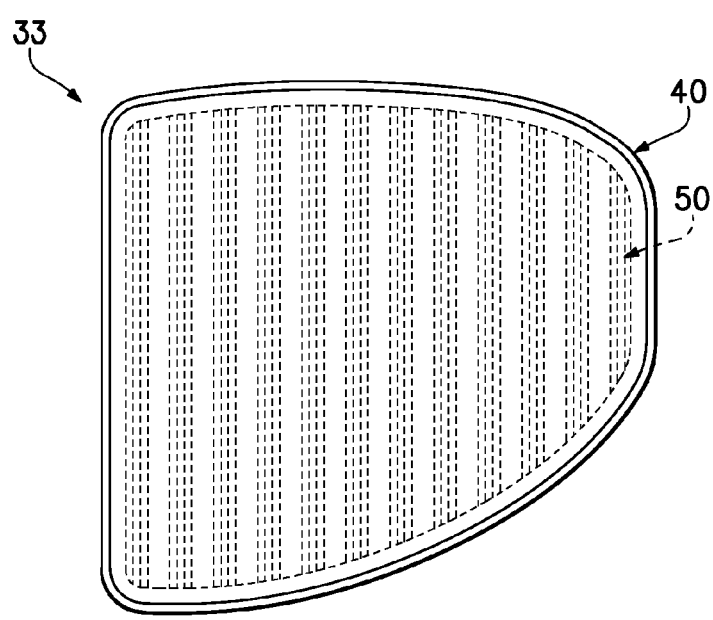
Figure 24B

METHOD OF MAKING CHAMBER WITH TENSILE MEMBER

CROSS-REFERENCE TO RELATED APPLICATION

This application is a divisional of prior pending nonprovisional application Ser. No. 12/123,646, filed 20 May 2008, the entire disclosure of which is incorporated herein by reference.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many conventional midsoles are primarily formed from a foamed polymer material, fluid-filled chambers or other non-foam structures may form a majority of some midsole configurations.

SUMMARY

A method of manufacturing a fluid-filled chamber is disclosed. The method includes locating a textile tensile member between two polymer elements. Pressure is applied to the tensile member and the polymer elements in a first area and in a second area. The pressure may be greater in the first area than in the second area. In addition, the polymer elements are bonded together around a periphery of the tensile member.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 6A-6D are cross-sectional views of the chamber, as defined by section lines 6A-6D in FIG. 5.

FIG. 7 is a lateral side elevational view of the chamber.

FIG. 8 is a medial side elevational view of the chamber.

FIGS. 16A-16C are schematic side elevational views of the laminating apparatus depicting steps in a laminating process for the chamber.

FIGS. 19A-19C are schematic side elevational views of the bonding apparatus depicting steps in a bonding process for the chamber.

FIG. 23 is a perspective view of the chamber and residual portions of polymer sheets forming the chamber following the thermoforming process.

FIGS. 24A-24C are top plan views of additional configurations of the chamber.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
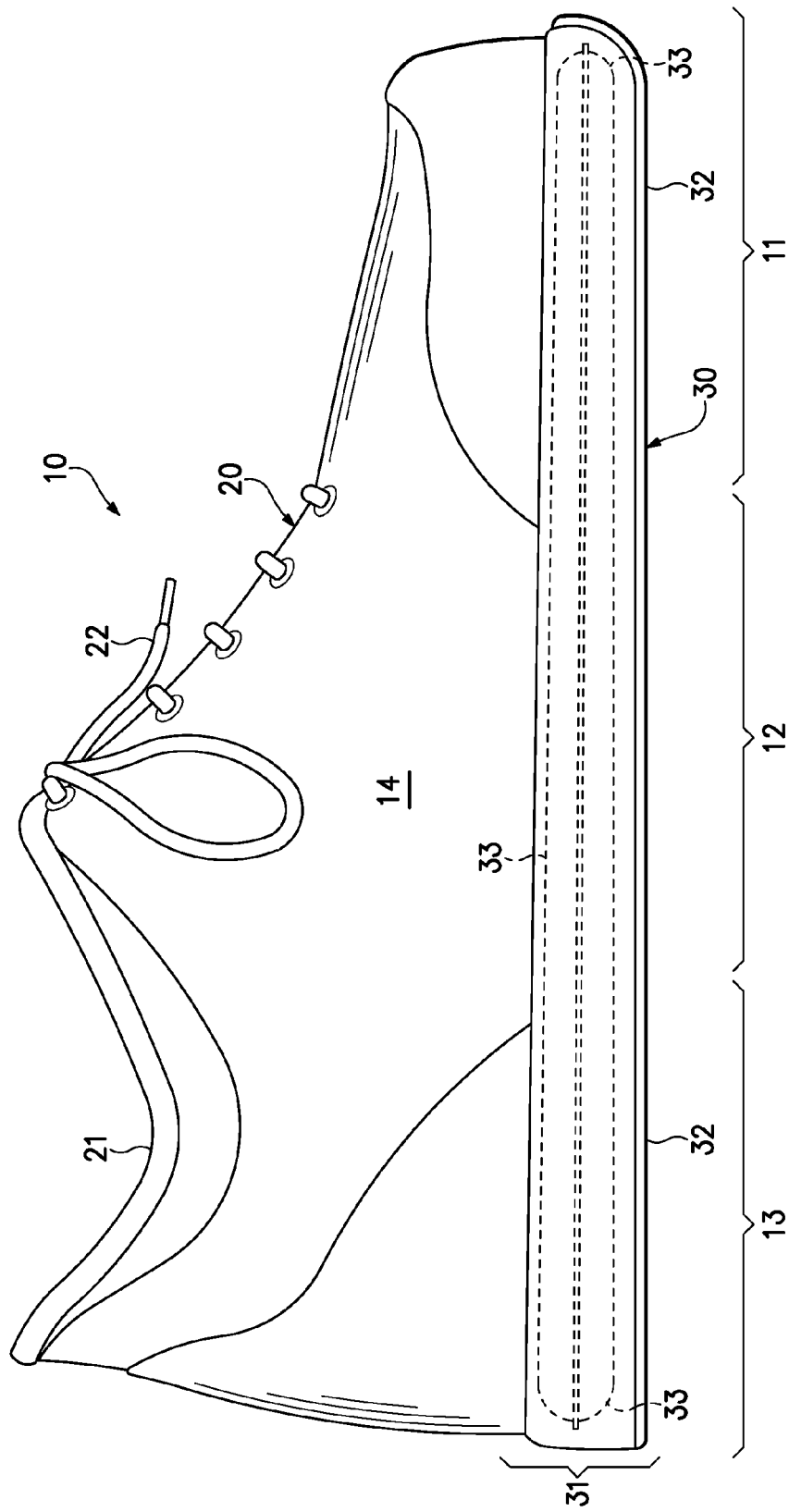
FIG. 1 is a lateral side elevational view of an article of footwear incorporating a fluid-filled chamber.
Figure 2:
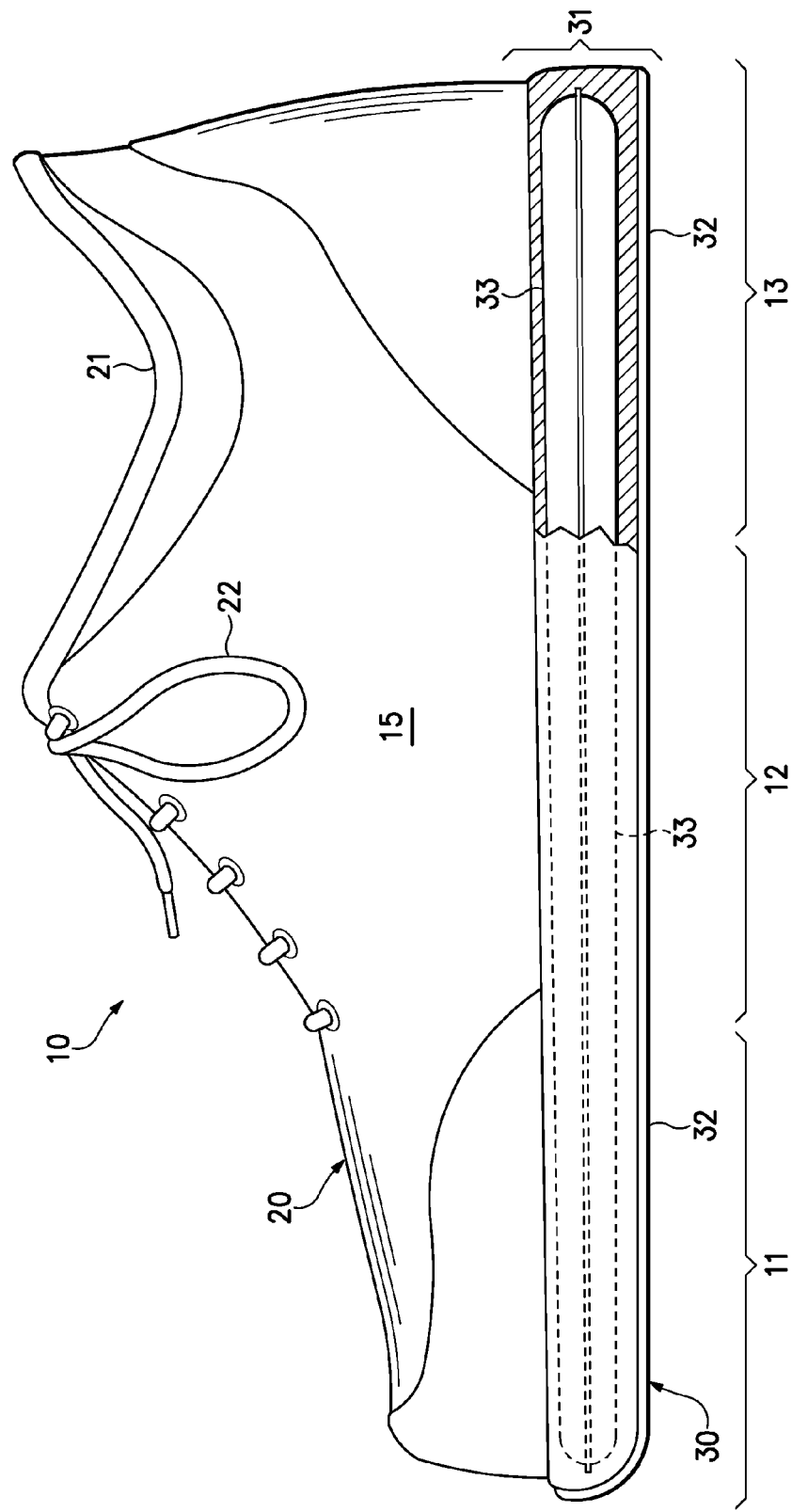
FIG. 2 is a medial side elevational view of the article of footwear.
Figure 3:
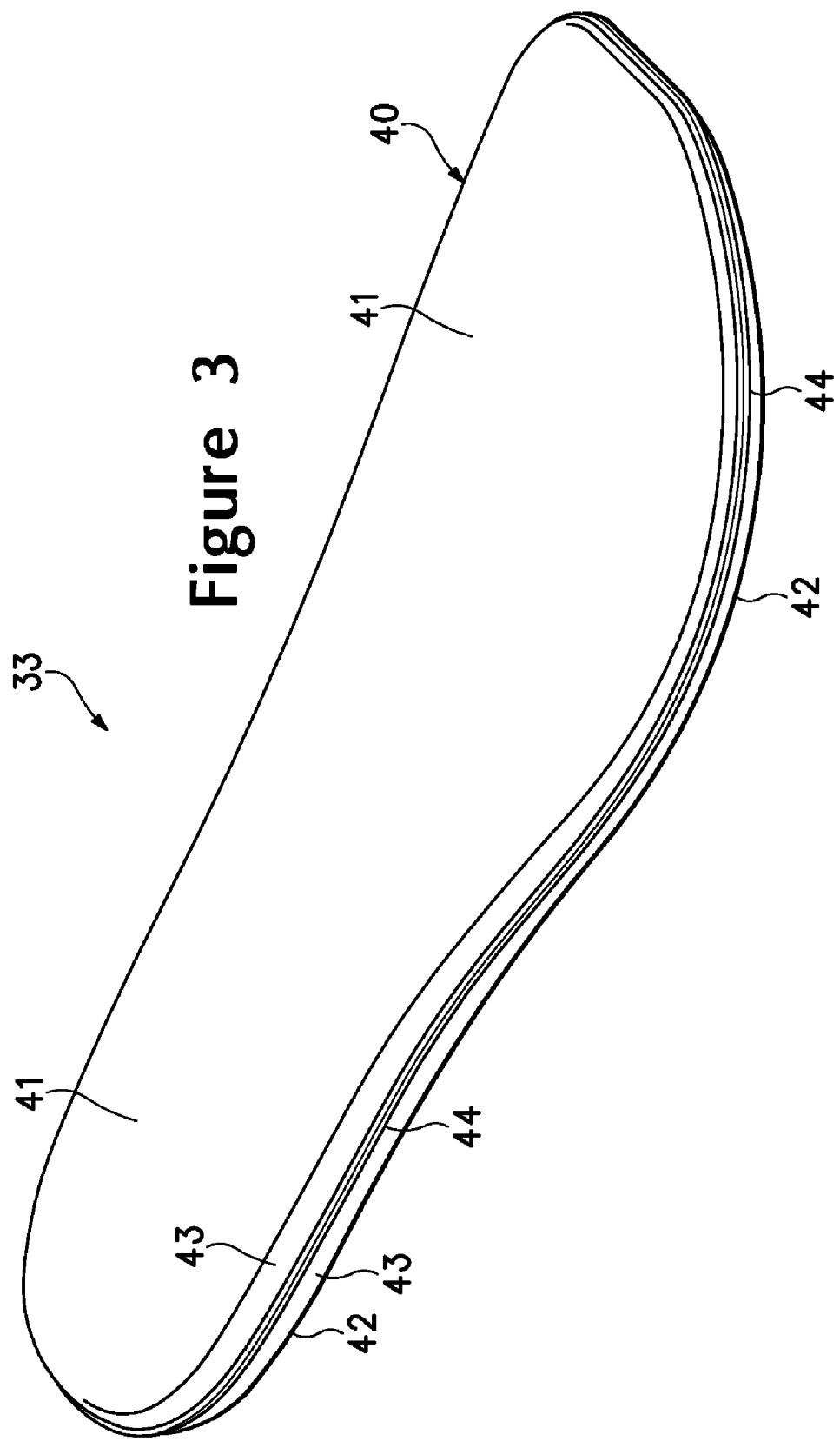
FIG. 3 is a perspective view of the chamber.
Figure 4:
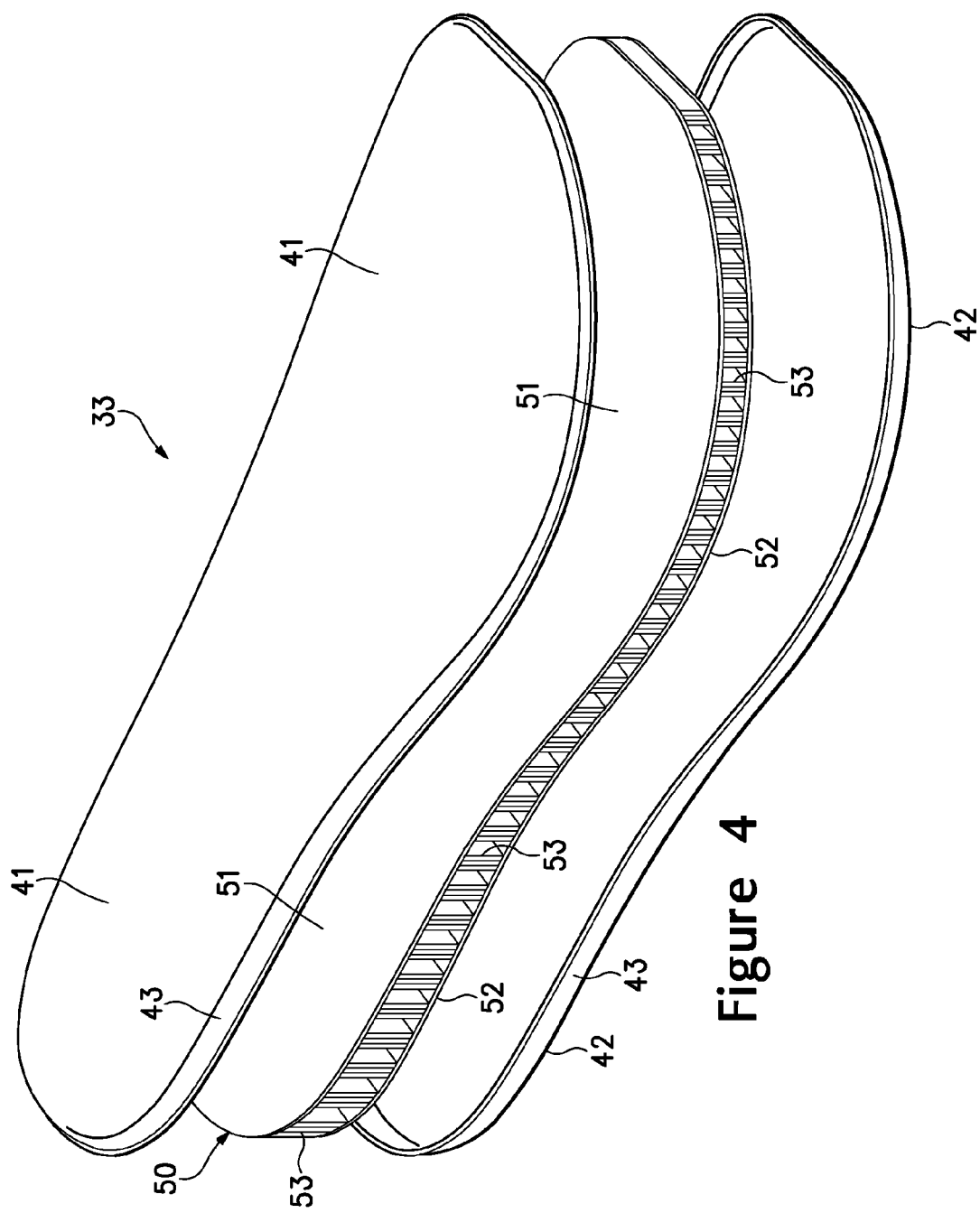
FIG. 4 is an exploded perspective view of the chamber.
Figure 5:
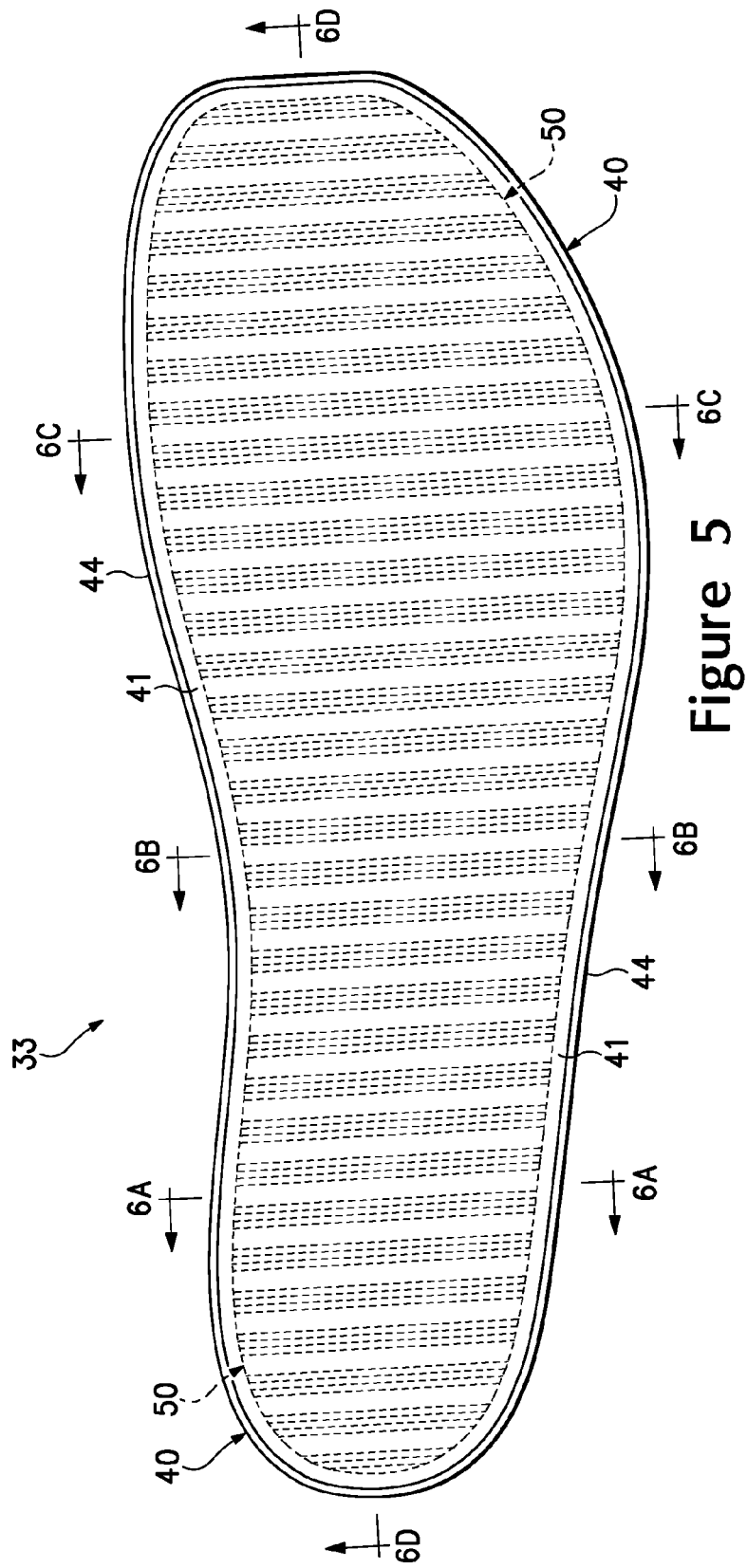
FIG. 5 is a top plan view of the chamber.
Figure 9:
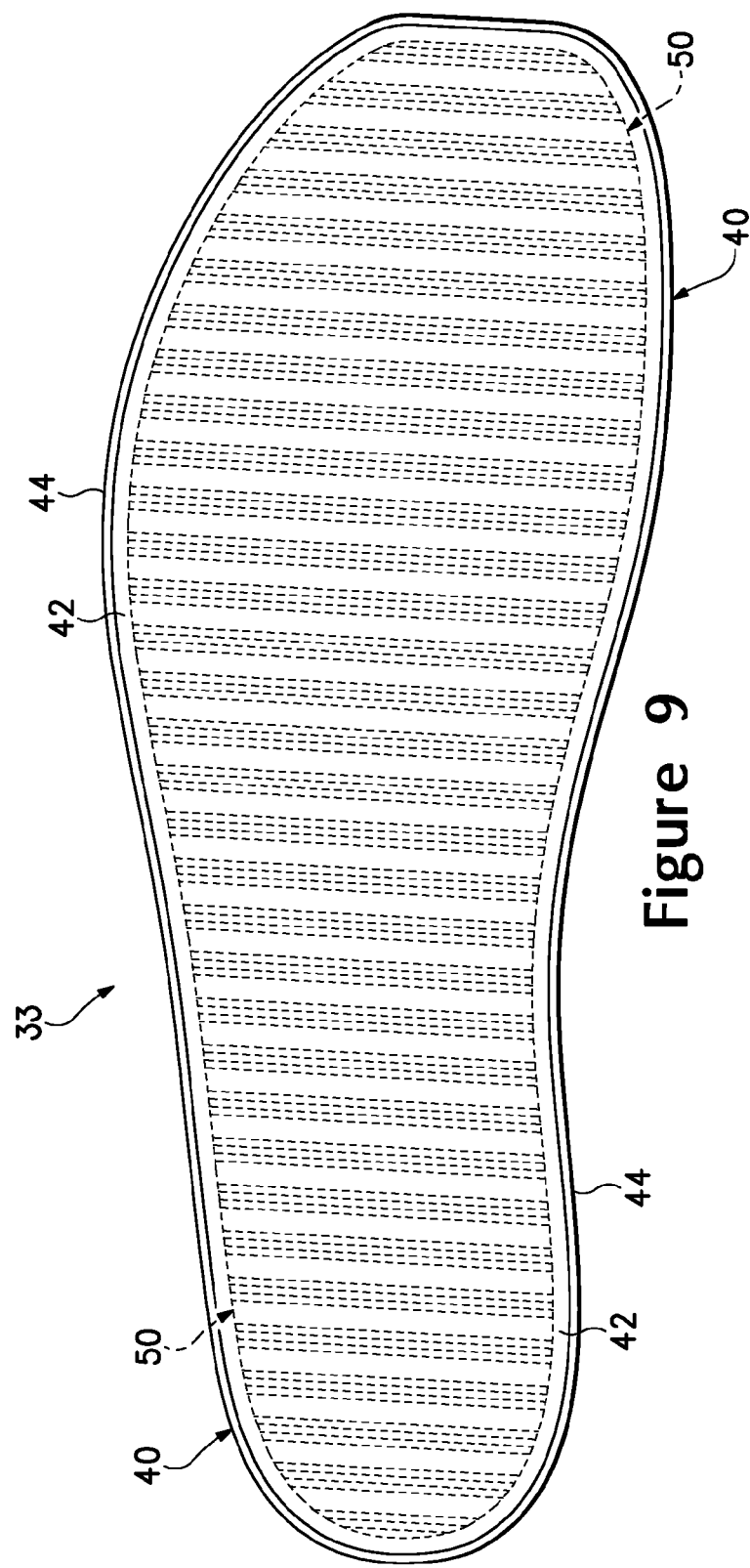
FIG. 9 is a bottom plan view of the chamber.
Figure 10:
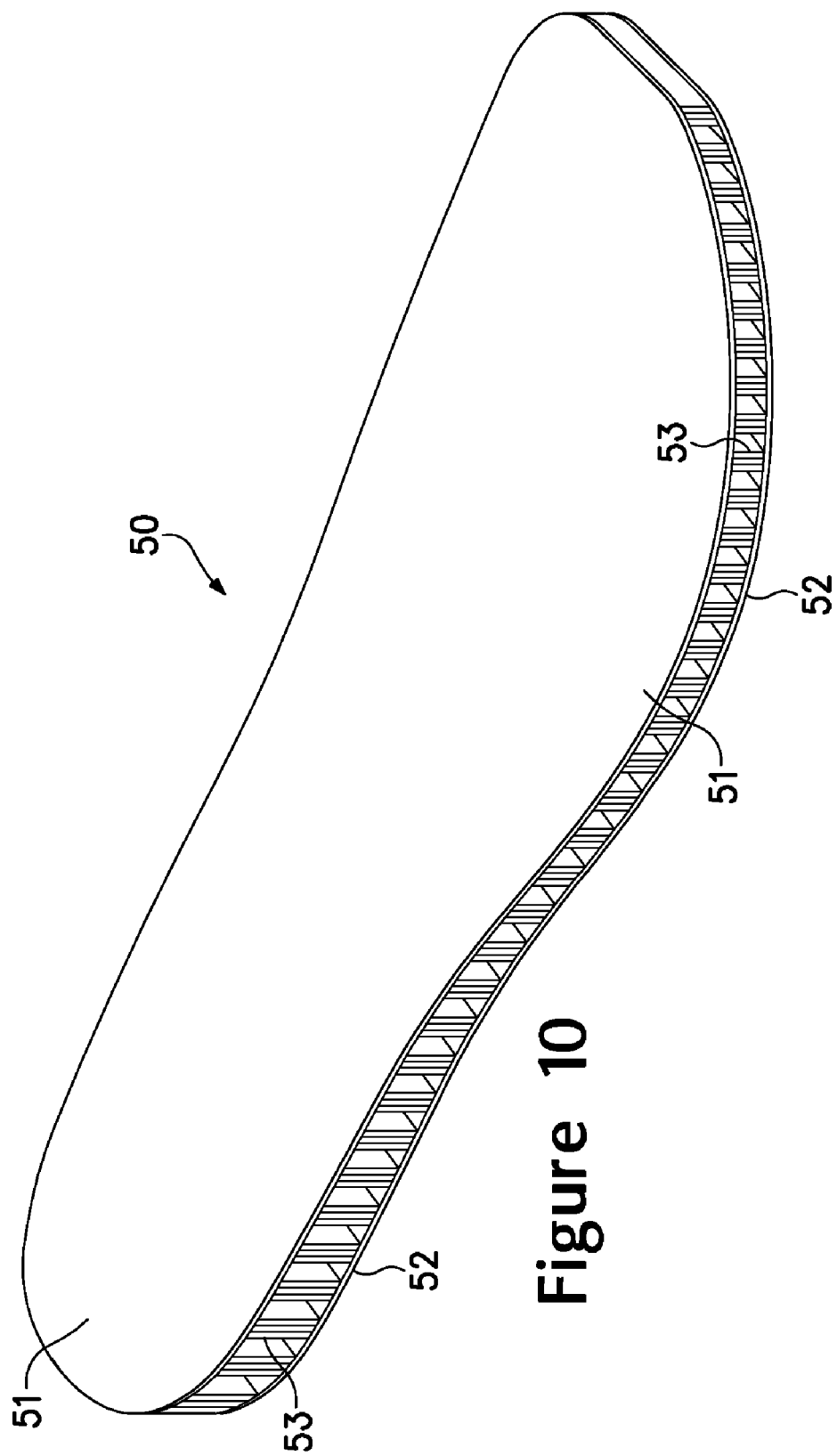
FIG. 10 is a perspective view of a tensile member of the chamber.
Figure 11:
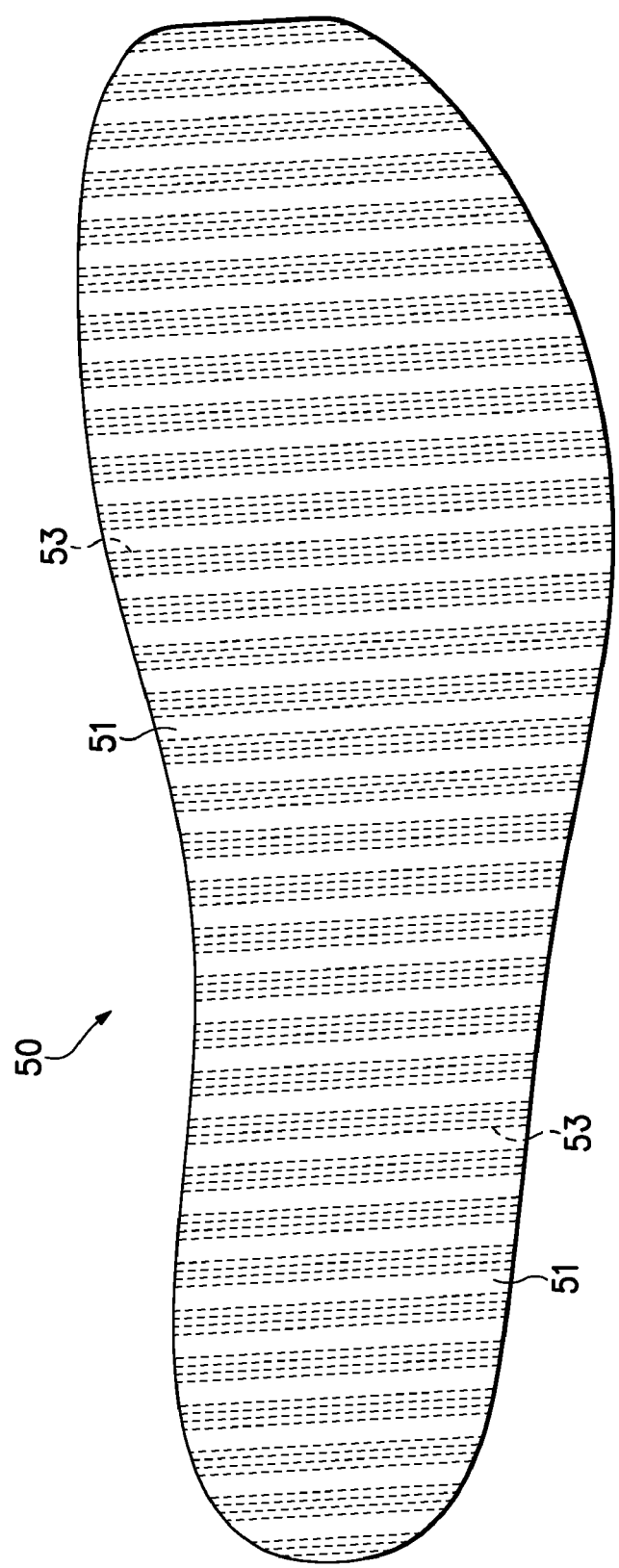
FIG. 11 is a top plan view of the tensile member.
Figure 12:
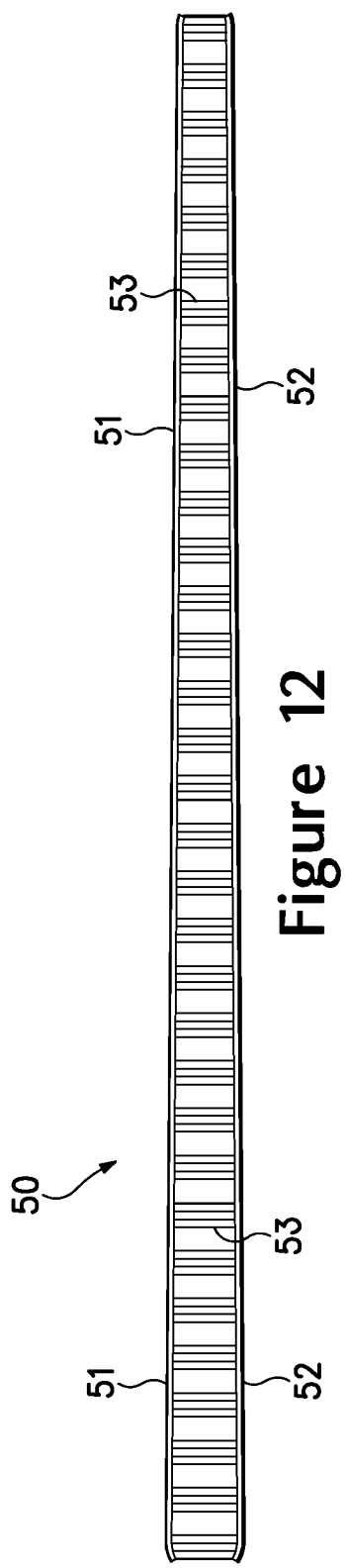
FIG. 12 is a lateral side elevational view of the tensile member.
Figure 13:
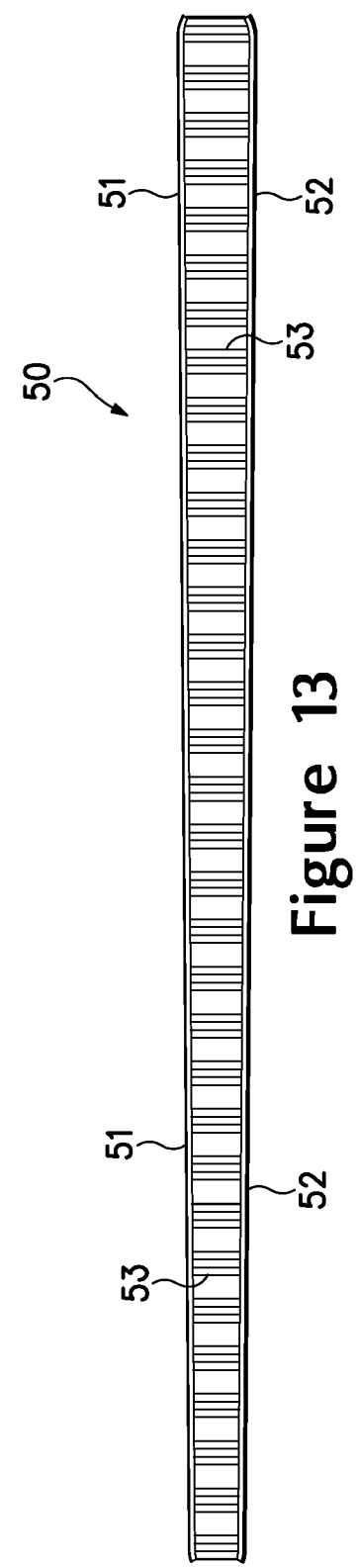
FIG. 13 is a medial side elevational view of the tensile member.
Figure 14:
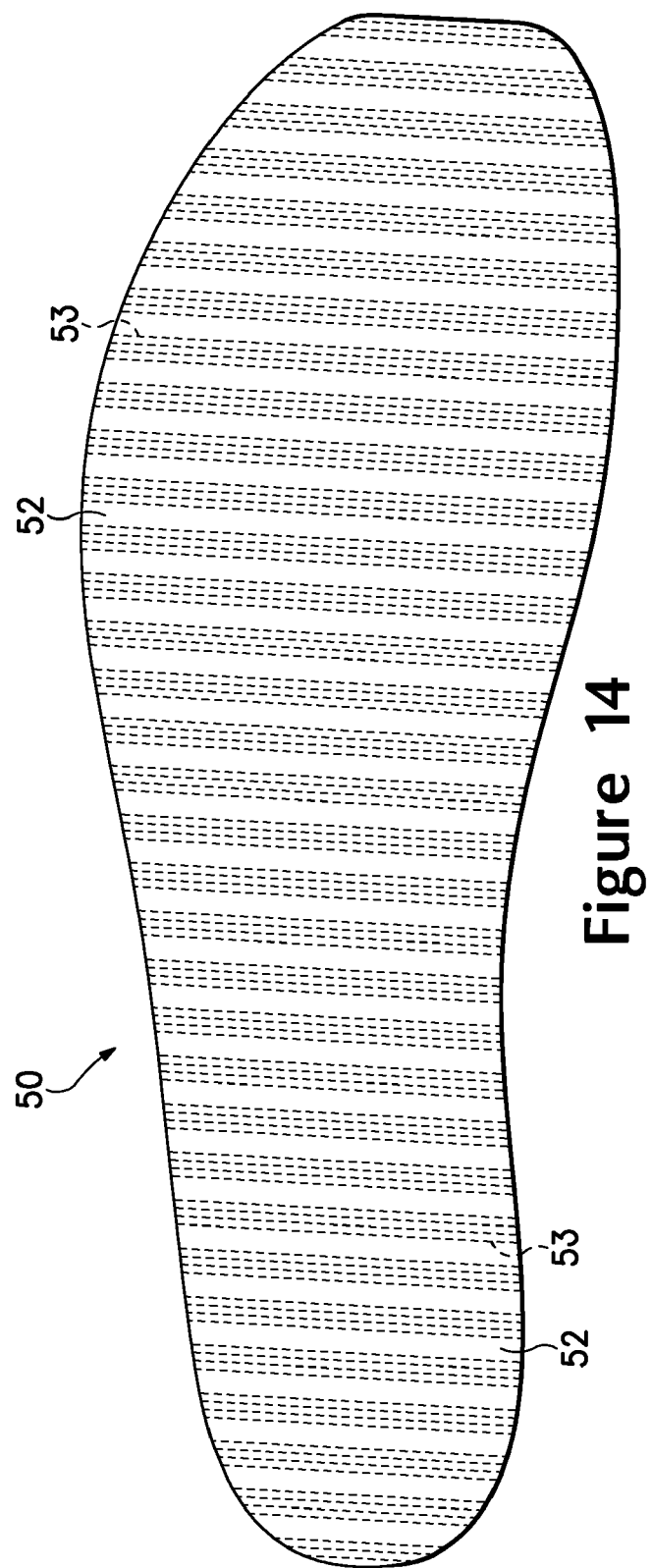
FIG. 14 is a bottom plan view of the tensile member.

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textile, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a midsole 31 and an outsole 32. Midsole 31 may be formed from a polymer foam material, such as polyurethane or ethylvinylacetate, that encapsulates a fluid-filled chamber 33. In addition to the polymer foam material and chamber 33, midsole 31 may incorporate one or more additional footwear elements that enhance the comfort, performance, or ground reaction force attenuation properties of footwear 10, including plates, moderators, lasting elements, or motion control members. Outsole 32, which may be absent in some configurations of footwear 10, is secured to a lower surface of midsole 31 and may be formed from a rubber material that provides a durable and wear-resistant surface for engaging the ground. In addition, outsole 32 may also be textured to enhance the traction (i.e., friction) properties between footwear 10 and the ground. Sole structure 30 may also incorporate an insole or sockliner that is located with in the void in upper 20 and adjacent a plantar (i.e., lower) surface of the foot to enhance the comfort of footwear 10.

Chamber Configuration

Chamber 33 is depicted individually in FIGS. 3-9 as having a configuration that is suitable for footwear applications. When incorporated into footwear 10, chamber 33 has a shape that fits within a perimeter of midsole 31 and substantially extends from forefoot region 11 to heel region 13 and also from lateral side 14 to medial side 15, thereby corresponding with a general outline of the foot. Although the polymer foam material of midsole 31 is depicted as forming a sidewall of midsole 31, chamber 33 may form a portion of the sidewall in some configurations of footwear 10. When the foot is located within upper 20, chamber 33 extends under substantially all of the foot in order to attenuate ground reaction forces that are generated when sole structure 30 is compressed between the foot and the ground during various ambulatory activities, such as running and walking. In other configurations, chamber 33 may extend under only a portion of the foot.

The primary elements of chamber 33 are a barrier 40 and a tensile member 50. Barrier 40 forms an exterior of chamber 33 and (a) defines an interior void that receives both a pressurized fluid and tensile member 50 and (b) provides a durable sealed barrier for retaining the pressurized fluid within chamber 33. The polymer material of barrier 40 includes an upper barrier portion 41, an opposite lower barrier portion 42, and a sidewall barrier portion 43 that extends around a periphery of chamber 33 and between barrier portions 41 and 42. Tensile member 50 is located within the interior void and has a configuration of a spacer-knit textile that includes an upper tensile layer 51, an opposite lower tensile layer 52, and a plurality of connecting members 53 that extend between tensile layers 51 and 52. Whereas upper tensile layer 51 is secured to an inner surface of upper barrier portion 41, lower tensile layer 52 is secured to an inner surface of lower barrier portion 42. Although discussed in greater detail below, either adhesive bonding or thermobonding may be utilized to secure tensile member 50 to barrier 40.

A variety of processes, two of which are discussed in greater detail below, may be utilized to manufacture chamber 33. In general, the manufacturing processes involve (a) securing a pair of polymer sheets, which form barrier portions 41-43, to opposite sides of tensile member 50 (i.e., to tensile layers 51 and 52) and (b) forming a peripheral bond 44 that joins a periphery of the polymer sheets and extends around sidewall barrier portion 43. A fluid may then be injected into the interior void and pressurized. The pressurized fluid exerts an outward force upon barrier 40, which tends to separate barrier portions 41 and 42. Tensile member 50, however, is secured to each of barrier portions 41 and 42 in order to retain the intended shape of chamber 33 when pressurized. More particularly, connecting members 53 extend across the interior void and are placed in tension by the outward force of the pressurized fluid upon barrier 40, thereby preventing barrier 40 from expanding outward and retaining the intended shape of chamber 33. Whereas peripheral bond 44 joins the polymer sheets to form a seal that prevents the fluid from escaping, tensile member 50 prevents barrier 40 from expanding outward or otherwise distending due to the pressure of the fluid. That is, tensile member 50 effectively limits the expansion of chamber 33 to retain an intended shape of barrier portions 41 and 42.

Chamber 33 is shaped and contoured to provide a structure that is suitable for footwear applications. As noted above, chamber 33 has a shape that fits within a perimeter of midsole 31 and extends under substantially all of the foot, thereby corresponding with a general outline of the foot. In addition, surfaces corresponding with barrier portions 41 and 42 are contoured in a manner that is suitable for footwear applications. With reference to FIGS. 7 and 8, for example, chamber 33 exhibits a tapered configuration between heel region 13 and forefoot region 11. That is, the portion of chamber 33 in heel region 13 exhibits a greater overall thickness than the portion of chamber 33 in forefoot region 11. When incorporated into footwear 10, the tapering of chamber 33 ensures that the heel of the foot is slightly raised in relation to the forefoot. In addition to tapering, chamber 33 may also define depressions and protrusions that complement the general anatomical structure of the foot.

The fluid within chamber 33 may be pressurized between zero and three-hundred-fifty kilopascals (i.e., approximately fifty-one pounds per square inch) or more. In addition to air and nitrogen, the fluid may include octafluorapropane or be any of the gasses disclosed in U.S. Pat. No. 4,340,626 to Rudy, such as hexafluoroethane and sulfur hexafluoride. In some configurations, chamber 33 may incorporate a valve or other structure that permits the individual to adjust the pressure of the fluid.

A wide range of polymer materials may be utilized for barrier 40. In selecting materials for barrier 40, engineering properties of the material (e.g., tensile strength, stretch properties, fatigue characteristics, dynamic modulus, and loss tangent) as well as the ability of the material to prevent the diffusion of the fluid contained by barrier 40 may be considered. When formed of thermoplastic urethane, for example, barrier 40 may have a thickness of approximately 1.0 millimeter, but the thickness may range from 0.25 to 2.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

In order to facilitate bonding between tensile member 50 and barrier 40, polymer supplemental layers may be applied to each of tensile layers 51 and 52. When heated, the supplemental layers soften, melt, or otherwise begin to change state so that contact with barrier portions 41 and 42 induces material from each of barrier 40 and the supplemental layers to intermingle or otherwise join with each other. Upon cooling, therefore, the supplemental layer is permanently joined with barrier 40, thereby joining tensile member 50 with barrier 40. In some configurations, thermoplastic threads or strips may be present within tensile layers 51 and 52 to facilitate bonding with barrier 40, as disclosed in U.S. Pat. No. 7,070,845 to Thomas, et al., or an adhesive may be utilized to secure barrier 40 and tensile member 50.

Tensile Member Configuration

Tensile member 50, which is depicted individually in FIGS. 10-14, includes upper tensile layer 51, the opposite lower tensile layer 52, and the plurality of connecting members 53 that extend between tensile layers 51 and 52. Each of tensile layers 51 and 52 have a generally continuous and planar configuration, although tensile layers 51 and 52 angle toward each other to impart the tapered configuration between heel region 13 and forefoot region 11. Connecting members 53 are secured to each of tensile layers 51 and 52 and space tensile layers 51 and 52 apart from each other. More particularly, the outward force of the pressurized fluid places connecting members 53 in tension and restrains further outward movement of tensile layers 51 and 52 and barrier portions 41 and 42. Connecting members 53 are arranged in rows that are separated by gaps. The use of gaps provides tensile member 50 with increased compressibility in comparison to tensile members formed of double-walled fabrics that utilize continuous connecting members, although continuous connecting members 53 may be utilized in some configurations of chamber 33. In comparing the lengths of connecting members 53, the connecting members 53 located in heel region 13 may be longer than the connecting members 53 in forefoot region 11 to impart the tapered configuration to tensile member 50.

In each of the manufacturing processes, tensile member 50 initially exhibits a non-contoured configuration. More particularly, tensile layers 51 and 52 are initially planar and parallel to each other. During the manufacturing processes, however, energy (e.g., in the form of radio frequency energy or heat) and pressure may alter the structure of tensile member 50 to impart contouring. That is, the energy and pressure may alter the lengths of connecting members 53 between heel region 13 and forefoot region 11 in order to impart the tapered configuration. More particularly, the energy and pressure may (a) deform a portion of connecting members 53 or (b) induce polymer material from barrier 40 or the supplemental layers to infiltrate tensile member 50, thereby effectively shortening the length of connecting members 53. Depending upon the degree of energy and pressure applied, connecting members 53 may be effectively shortened through both deformation and infiltration of the polymer material.

Tensile member 50 is formed as a unitary (i.e., one-piece) textile element having the configuration of a spacer-knit textile. A variety of knitting techniques may be utilized to form tensile member 50 and impart a specific configuration (e.g., taper, contour, length, width, thickness) to tensile member 50. In general, knitting involves forming courses and wales of intermeshed loops of a yarn or multiple yarns. In production, knitting machines may be programmed to mechanically-manipulate yarns into the configuration of tensile member 50. That is, tensile member 50 may be formed by mechanically-manipulating yarns to form a one-piece textile element that has a particular configuration. The two major categories of knitting techniques are weft-knitting and warp-knitting. Whereas a weft-knit fabric utilizes a single yarn within each course, a warp-knit fabric utilizes a different yarn for every stitch in a course. Various types of weft-knitting and warp-knitting may be utilized, including wide tube circular knitting, narrow tube circular knit jacquard, single knit circular knit jacquard, double knit circular knit jacquard, warp knit jacquard, flat knitting, and double needle bar raschel knitting, for example. Accordingly, a variety of knitting techniques may be utilized in manufacturing tensile member 50.

For purposes of the present discussion, the term "yarn" or variants thereof is intended to encompass a variety of generally one-dimensional materials (e.g., filaments, fibers, threads, strings, strands, and combinations thereof) that may be utilized to form a textile. The properties of tensile member 50 may relate to the specific materials that are utilized in the yarns. Examples of properties that may be relevant in selecting specific yarns for tensile member 50 include tensile strength, tensile modulus, density, flexibility, tenacity, resistance to abrasion, and resistance to degradation (e.g., from water, light, and chemicals). Examples of suitable materials for the yarns include rayon, nylon, polyester, polyacrylic, silk, cotton, carbon, glass, aramids (e.g., para-aramid fibers and meta-aramid fibers), ultra high molecular weight polyethylene, and liquid crystal polymer. Although each of these materials exhibit properties that are suitable for tensile member 50, each of these materials exhibit different combinations of material properties. Accordingly, the properties of yarns formed from each of these materials may be compared in selecting materials for the yarns within tensile member 50. Moreover, factors relating to the combination of yarns and the type of knit or type of textile may be considered in selecting a specific configuration for tensile member 50.

First Manufacturing Process

Although a variety of manufacturing processes may be utilized to form chamber 33, an example of a suitable process will now be discussed. In general, the process involves (a) utilizing a laminating apparatus to secure a pair of polymer sheets 41' and 42' to opposite sides of tensile member 50 (i.e., to tensile layers 51 and 52) and then (b) utilizing a bonding apparatus to form peripheral bond 44 between polymer sheets 41' and 42'. Although the laminating apparatus and the separate bonding apparatus are utilized, a single apparatus that both laminates and bonds may also be utilized to substantially manufacture chamber 33 in a single step.

Figure 15:
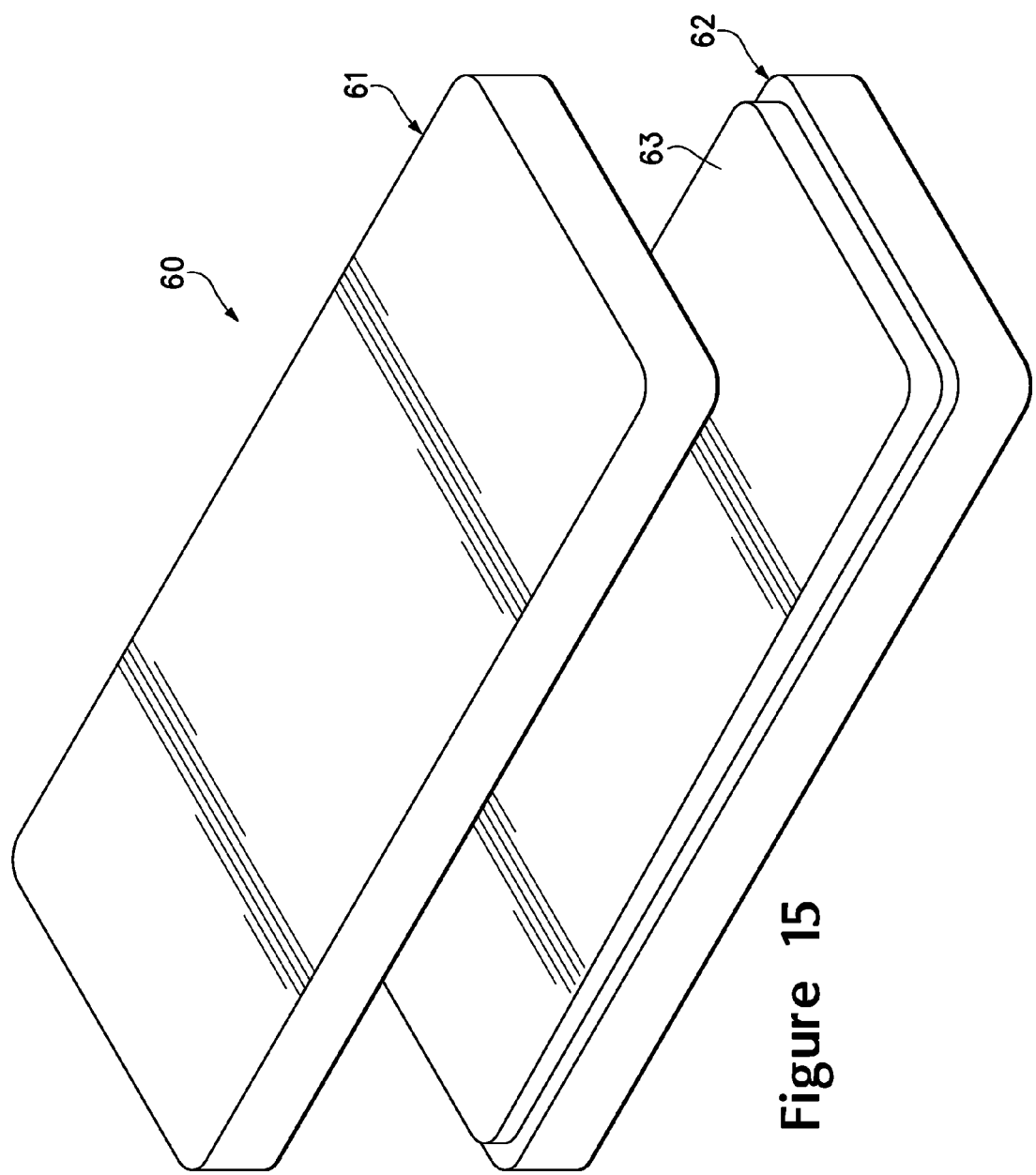
FIG. 15 is a perspective view of a laminating apparatus.

With reference to FIG. 15, a laminating apparatus 60 is depicted as including an upper portion 61 and an opposite lower portion 62. In addition, a spacer 63 is secured to lower portion 62 and forms a non-parallel surface with upper portion 61. Whereas opposing surfaces of portions 61 and 62 are substantially parallel, spacer 63 has a tapered configuration, thereby forming a surface that is non-parallel with upper portion 61. Although the taper in spacer 63 may vary significantly, a suitable taper is 0.50 millimeters (i.e., approximately 0.020 inches) for each 30 centimeters (i.e., approximately 12 inches) across spacer 63, but may range from 0.05 millimeters to 13 millimeters. That is, the thickness of spacer 63 in one area may be at least 0.50 millimeters greater than the thickness in an area that is 30 centimeters away, or the difference may be greater or less.

Figure 16A:
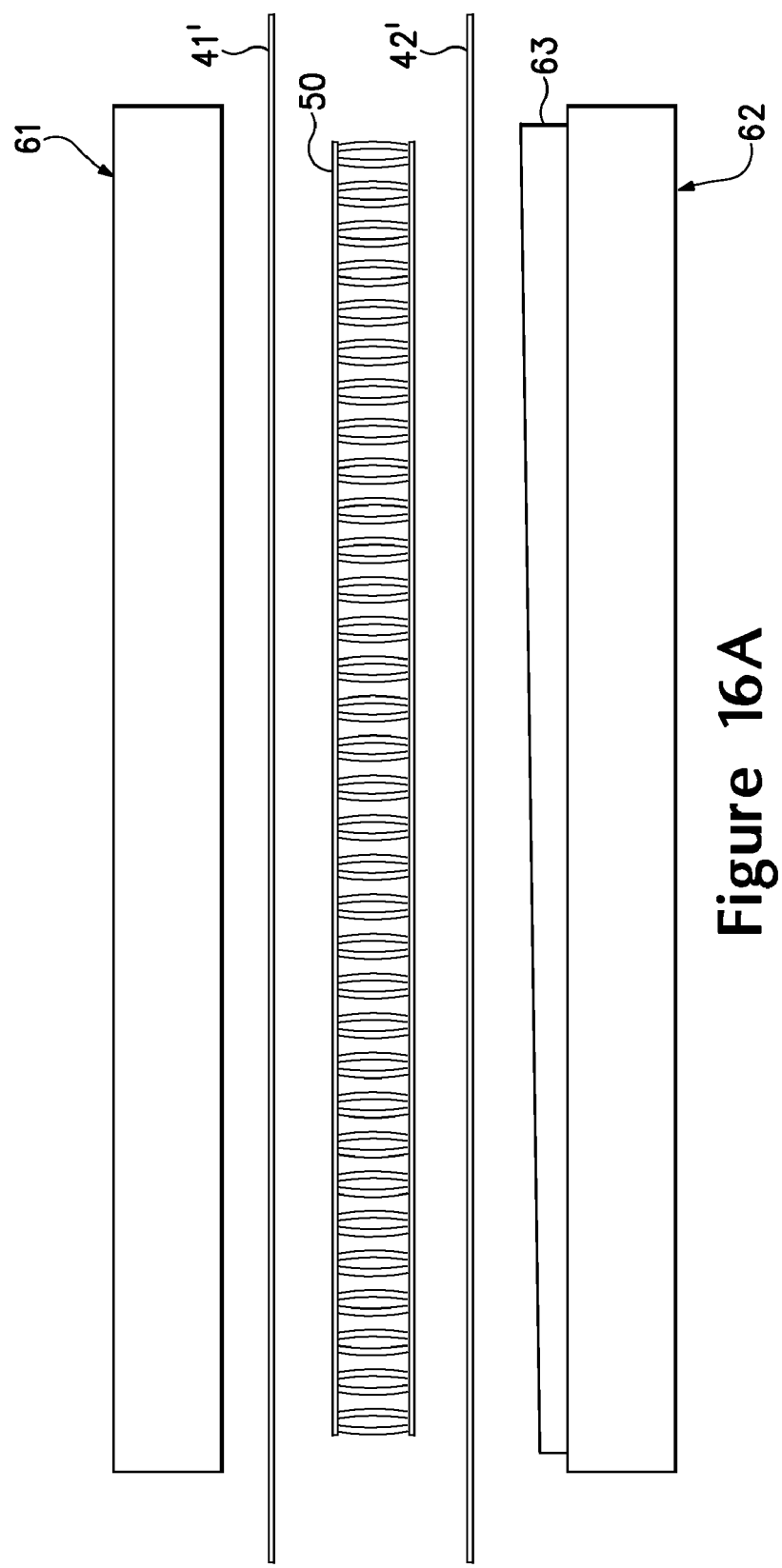

In utilizing laminating apparatus 60, tensile member 50 is located between polymer sheets 41' and 42', and these components of chamber 33 are placed within laminating apparatus 60, as depicted in FIG. 16A. More particularly, polymer sheet 41' is located adjacent to upper portion 61, and polymer sheet 42' is located adjacent to lower portion 62 and spacer 63, with tensile member 50 being located therebetween. Once positioned, laminating apparatus 60 closes such that the components of chamber 33 are compressed between upper portion 61 and spacer 63, as depicted in FIG. 16B. As discussed above, spacer 63 has a tapered configuration and forms a surface that is non-parallel with upper portion 61. The tapered configuration of spacer 63 provides different degrees of compression in different areas of polymer sheet 41', polymer sheet 42', and tensile member 50. That is, the components of chamber 33 will be compressed less where spacer 63 has lesser thickness, and the elements will be compressed more where spacer 63 has greater thickness. Accordingly, the non-parallel surfaces within laminating apparatus 60 impart different degrees of pressure to different areas of the components of chamber 33. Furthermore, the taper in spacer 63 ensures a continuously-varying degree of pressure is applied to the components of chamber 33.

Although polymer sheet 41', polymer sheet 42', and tensile member 50 may be oriented in different ways within laminating apparatus 60, the tapered configuration of chamber 33 may arise when portions of the components of chamber 33 located in forefoot region 11 are compressed more than portions of the components located within heel region 13. That is, the taper in spacer 63 may be utilized to apply greater pressure to the portions of the components of chamber 33 located in forefoot region 11 than the portions of the components located within heel region 13.

While being compressed, radio frequency energy (RF energy) may be emitted by laminating apparatus 60 in order to heat polymer sheet 41', polymer sheet 42', and tensile member 50. More particularly, the radio frequency energy may pass from upper portion 61 to lower portion 62 and spacer 63. The amount of radio frequency energy passing between upper portion 61 and spacer 63 at least partially depends upon the spacing between upper portion 61 and spacer 63. Given the tapered configuration of spacer 63, areas of spacer 63 with greater thickness are closer to upper portion 61 than areas of spacer 63 with lesser thickness. The components of chamber 33, therefore, will be exposed to more radio frequency energy in areas where spacer 63 has greater thickness, and the components of chamber 33 will be exposed to less radio frequency energy in areas where spacer 63 has lesser thickness. Accordingly, the non-parallel surfaces within laminating apparatus 60 impart different degrees of radio frequency energy to different areas of polymer sheet 41', polymer sheet 42', and tensile member 50.

Figure 17:
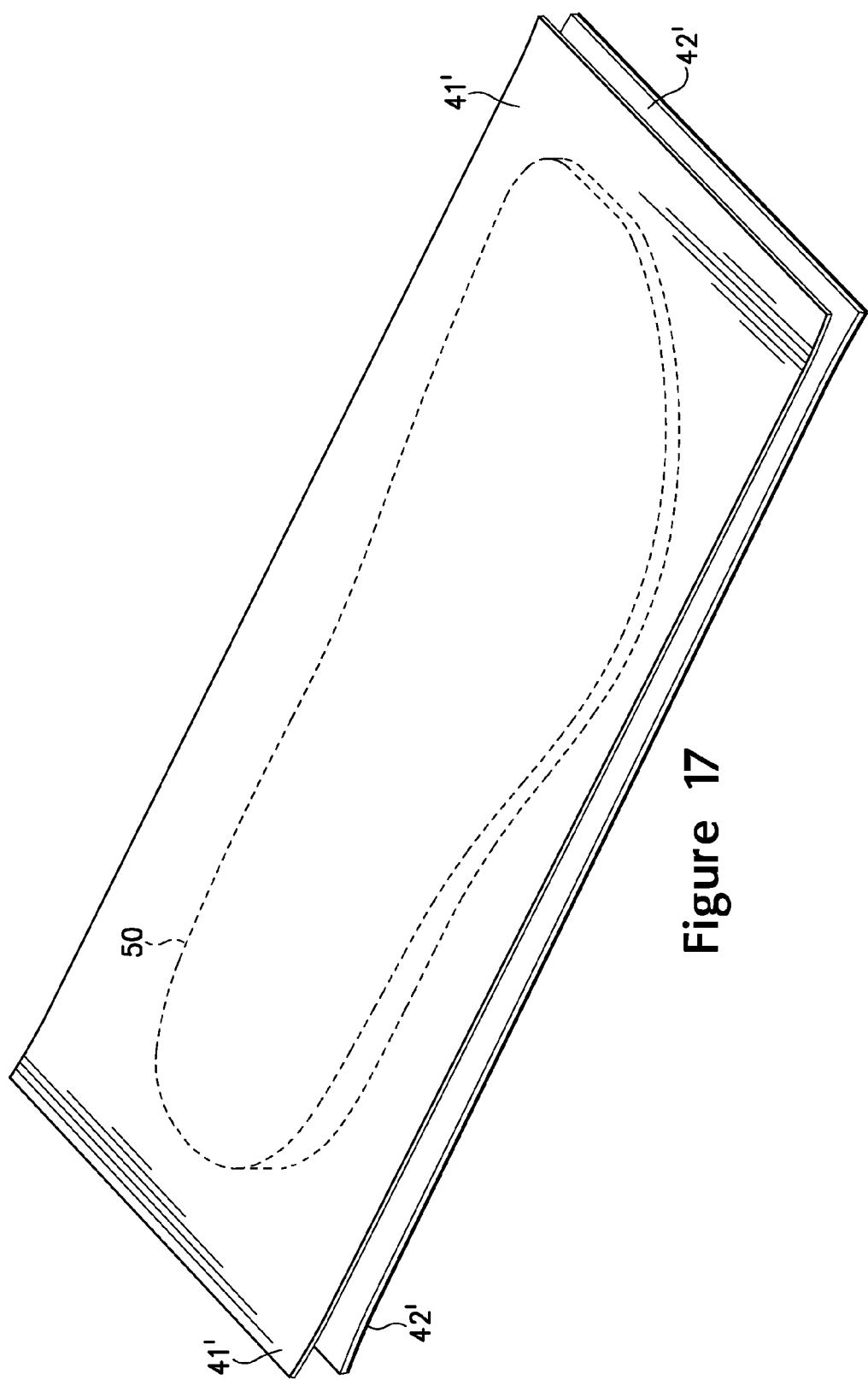
FIG. 17 is a perspective view of elements of the chamber following the laminating process.

Following compression and irradiation with radio frequency energy (i.e., heating), laminating apparatus 60 opens such that polymer sheet 41', polymer sheet 42', and tensile member 50 may be removed, as depicted in FIGS. 16C and 17. The compression and heating of polymer sheets 41' and 42' caused bonding between the elements. More particularly, the compression and heating induced polymer sheet 41' to bond with upper tensile layer 51 and also induced polymer sheet 42' to bond with lower tensile layer 52. In addition, the differences in compression and radio frequency energy due to the tapering of spacer 63 effectively shortened the lengths of some of connecting member 53. More particularly, the compression and heating (a) deformed a portion of connecting members 53 or (b) induced polymer material from polymer sheet 41', polymer sheet 42', or the supplemental layers to infiltrate tensile member 50, thereby effectively shortening the lengths of connecting members 53 in the areas where compression and heating were greatest. Depending upon the degree of compression and irradiation, both deformation and infiltration of polymer material may cause the shortening of connecting members 53. Accordingly, differences in compression and irradiation effectively imparted a tapered configuration to tensile member 50. That is, the greater pressure and heat in the portions of the components of chamber 33 located in forefoot region 11, as compared to the portions of the components located within heel region 13, impart the tapered configuration to tensile member 50 and chamber 33.

Depending upon the specific materials utilized for tensile member 50 and polymer layers 41' and 42', the temperature range that facilitates bonding may extend from 120 to 200 degrees Celsius (248 to 392 degrees Fahrenheit) or more. As an example, a material having alternating layers of thermoplastic polyurethane and ethylene-vinyl alcohol copolymer may be heated to a temperature in a range of 149 to 188 degrees Celsius (300 and 370 degrees Fahrenheit) to facilitate bonding. Although radio frequency energy may be utilized, as discussed above, various radiant heaters or other devices may be utilized to heat the components of chamber 33, or laminating apparatus 60 may be heated such that contact between laminating apparatus 60 and the components of chamber 33 raises the temperature to a level that facilitates bonding.

Based upon the above discussion, one or both of pressure and heat may be utilized to impart contouring to chamber 33. Although the pressure and heat are applied by laminating apparatus 60, the shape of tensile member 50 may also be modified prior to the use of laminating apparatus 60. That is, a separate apparatus may be utilized to compress or heat tensile member 50 in order to effectively shorten connecting members 53. Furthermore, the tapering of spacer 63 imparted a corresponding taper in tensile member 50, but other contours (i.e., protrusions and indentations, may also be formed by modifying the surface characteristics of spacer 63.

Figure 18:
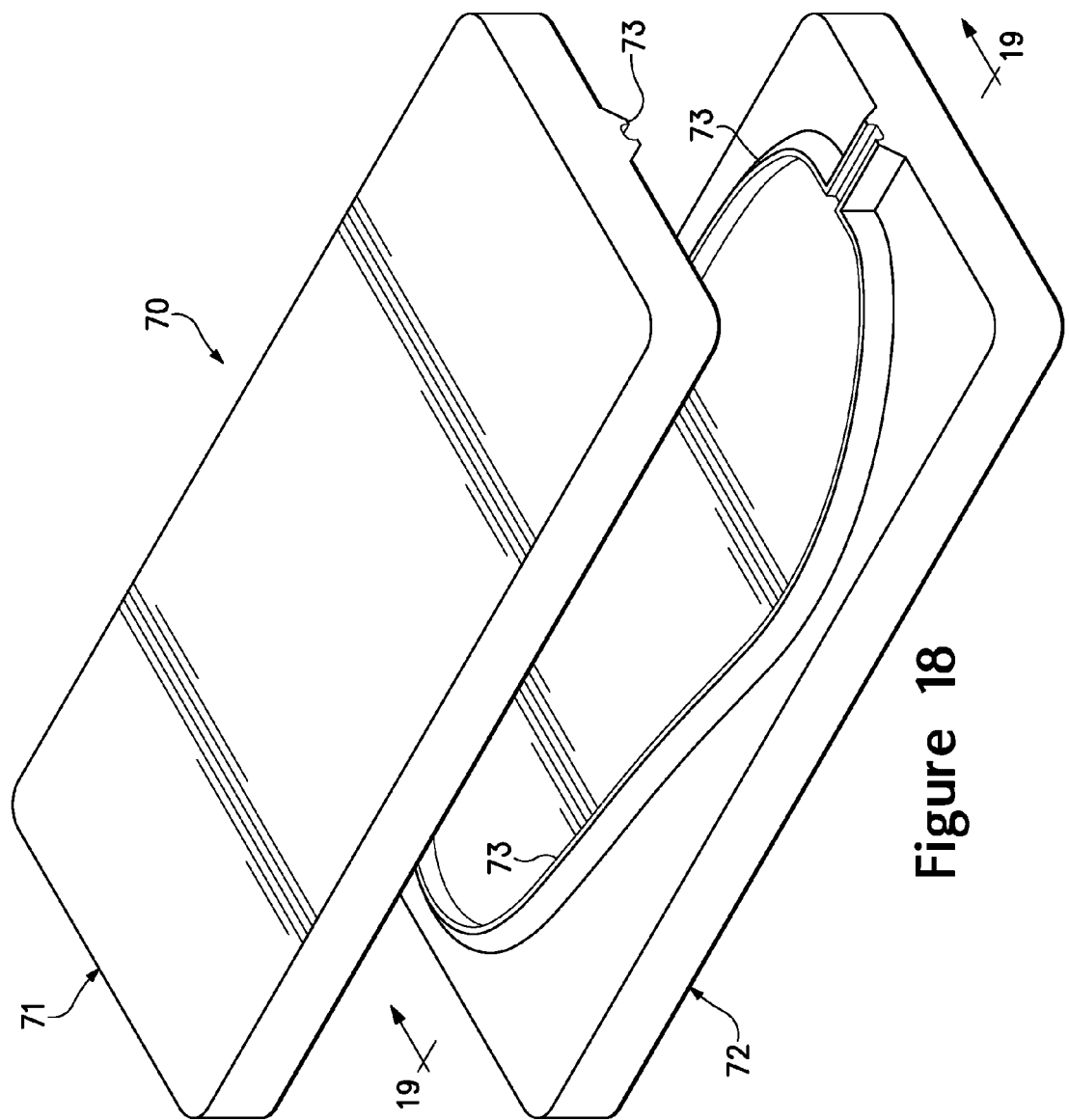
FIG. 18 is a perspective view of a bonding apparatus.
Figure 19A:
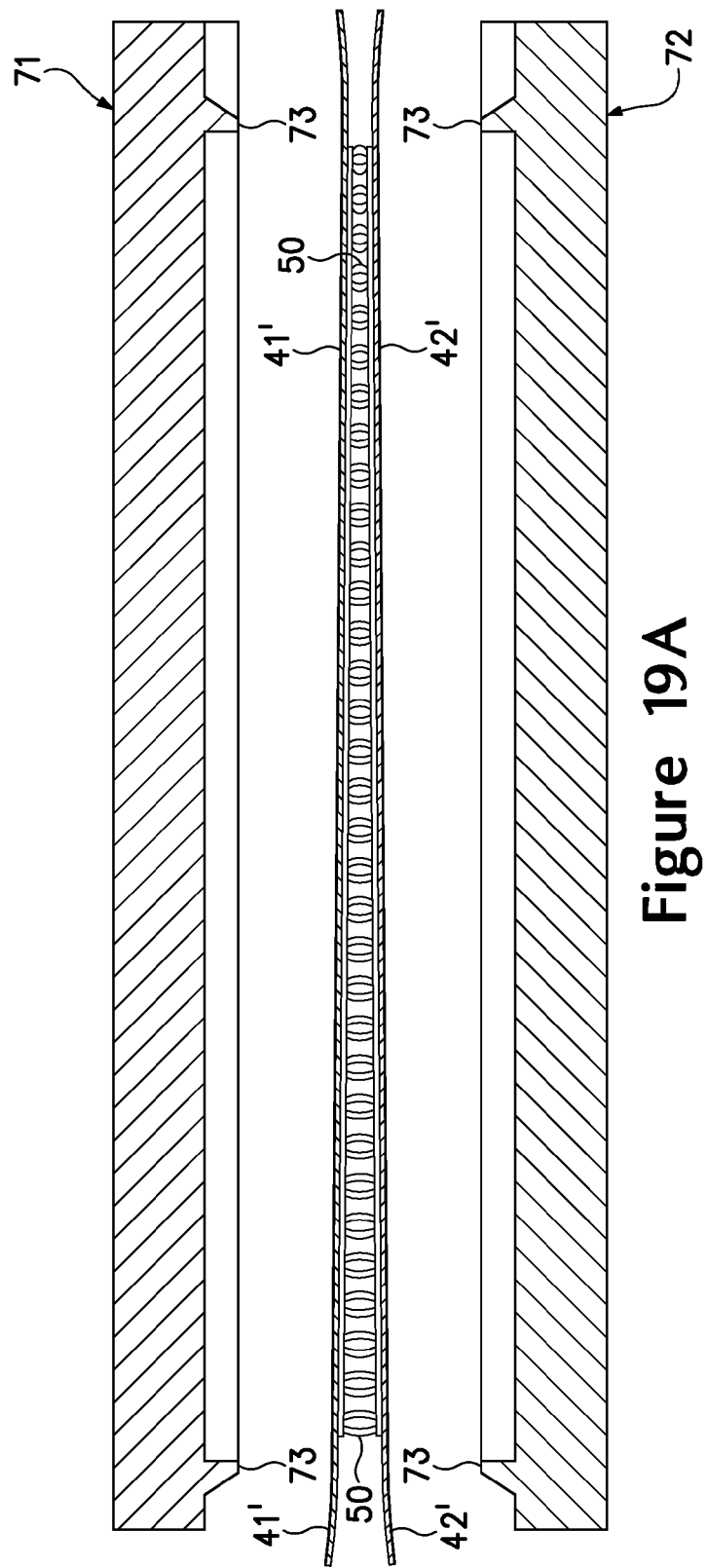

Following the use of laminating apparatus 60 to secure polymer sheets 41' and 42' to opposite sides of tensile member 50 and impart the contour, a bonding apparatus 70 is utilized to form peripheral bond 44 between polymer sheets 41' and 42'. Referring to FIG. 18, bonding apparatus 70 is depicted as including an upper portion 71 and a lower portion 72 that each define a pair of ridges 73 with a general shape of the outline of chamber 33. Referring to FIG. 19A, the components of chamber 33 are located between upper portion 71 and lower portion 72. In order to properly position the components, a shuttle frame or other device may be utilized. Once positioned, portions 71 and 72 translate toward each other and begin to close upon the components such that ridges 73 extend around tensile member 50 and compress polymer sheets 41' and 42' together, as depicted in FIG. 19B. Heat from bonding apparatus 70 or heat applied to polymer sheets 41' and 42' prior to being located within bonding apparatus 70 may be utilized to form peripheral bond 44 when compressed by ridges 73.

Figure 20:
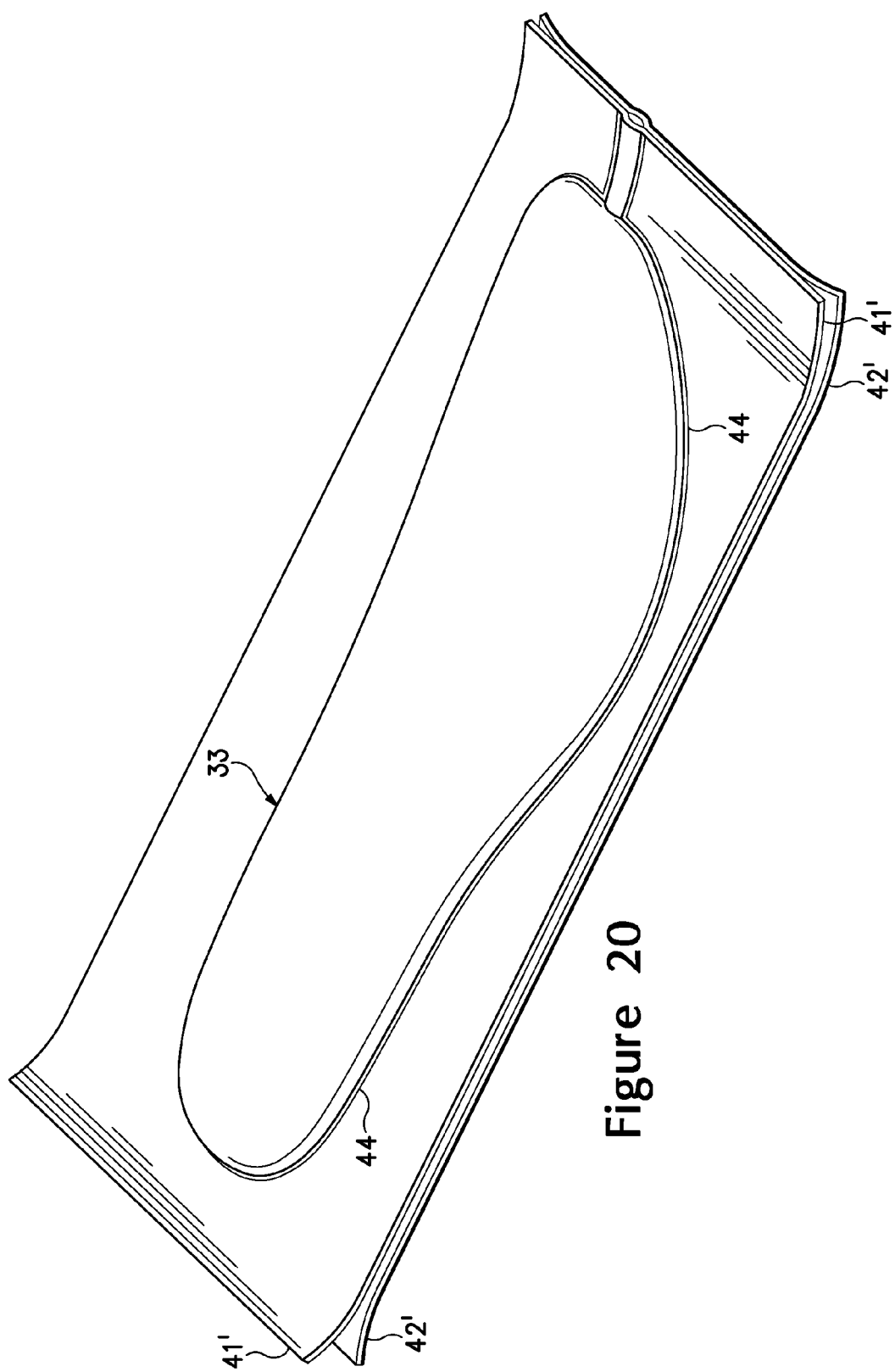
FIG. 20 is a perspective view of the chamber and residual portions of polymer sheets forming the chamber following the bonding process.

When bonding is complete, bonding apparatus 70 is opened and chamber 33 and excess portions of polymer sheets 41' and 42' are removed and permitted to cool, as depicted in FIGS. 19C and 20. A fluid may be injected into chamber 33. The excess portions of polymer sheets 41' and 42' are then removed, thereby completing the manufacture of chamber 33. As an alternative, the order of inflation and removal of excess material may be reversed. As a final step in the process, chamber 33 may be tested and then incorporated into midsole 31 of footwear 10.

Chamber 33 exhibits a tapered configuration between heel region 13 and forefoot region 11. Although tensile member 50 initially has a non-tapered configuration, the application of different degrees of pressure and heat to areas of tensile member 50 during the laminating process or other manufacturing steps may impart a taper to tensile member 50, which imparts the taper to chamber 33 between heel region 13 and forefoot region 11.

Second Manufacturing Process

Figure 21:
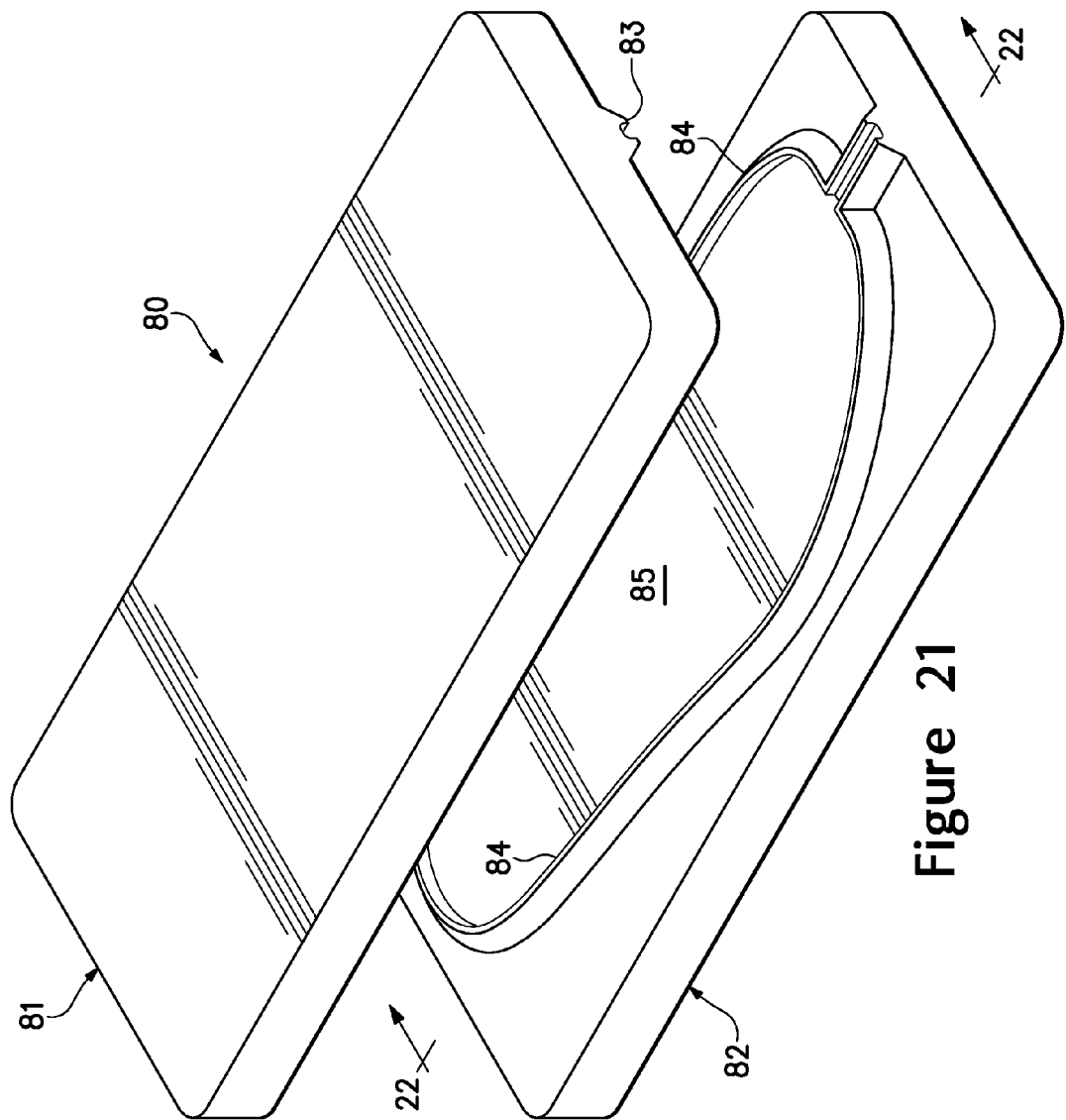
FIG. 21 is a perspective view of a thermoforming apparatus for forming the chamber.

Another example of a suitable manufacturing processes for chamber 33 will now be discussed. With reference to FIG. 21, a thermoforming apparatus 80 that may be utilized in the manufacturing process is depicted as including an upper mold portion 81 and a lower mold portion 82. In general, the process involves utilizing thermoforming apparatus 80 to (a) bond tensile member 50 to each of polymer sheets 41' and 42', (b) shape polymer sheets 41' and 42', and (c) form peripheral bond 44 between the two polymer sheets 41' and 42'. Whereas laminating apparatus 60 and bonding apparatus 70 are utilized in the first manufacturing process described above, only thermoforming apparatus 80 is utilized in this manufacturing process.

Initially, one or more of tensile member 50 and polymer sheets 41' and 42' are heated to a temperature that facilitates bonding between the components. Depending upon the specific materials utilized for tensile member 50 and polymer sheets 41' and 42', which form barrier 40, suitable temperatures may range from 120 to 200 degrees Celsius (248 to 392 degrees Fahrenheit) or more. As an example, a material having alternating layers of thermoplastic polyurethane and ethylene-vinyl alcohol copolymer may be heated to a temperature in a range of 149 to 188 degrees Celsius (300 and 370 degrees Fahrenheit) to facilitate bonding. Various radiant heaters, radio frequency heaters, or other devices may be utilized to heat the components of chamber 33. In some manufacturing processes, thermoforming apparatus 80 may be heated such that contact between thermoforming apparatus 80 and the components of chamber 33 raises the temperature of the components to a level that facilitates bonding.

Figure 22A:
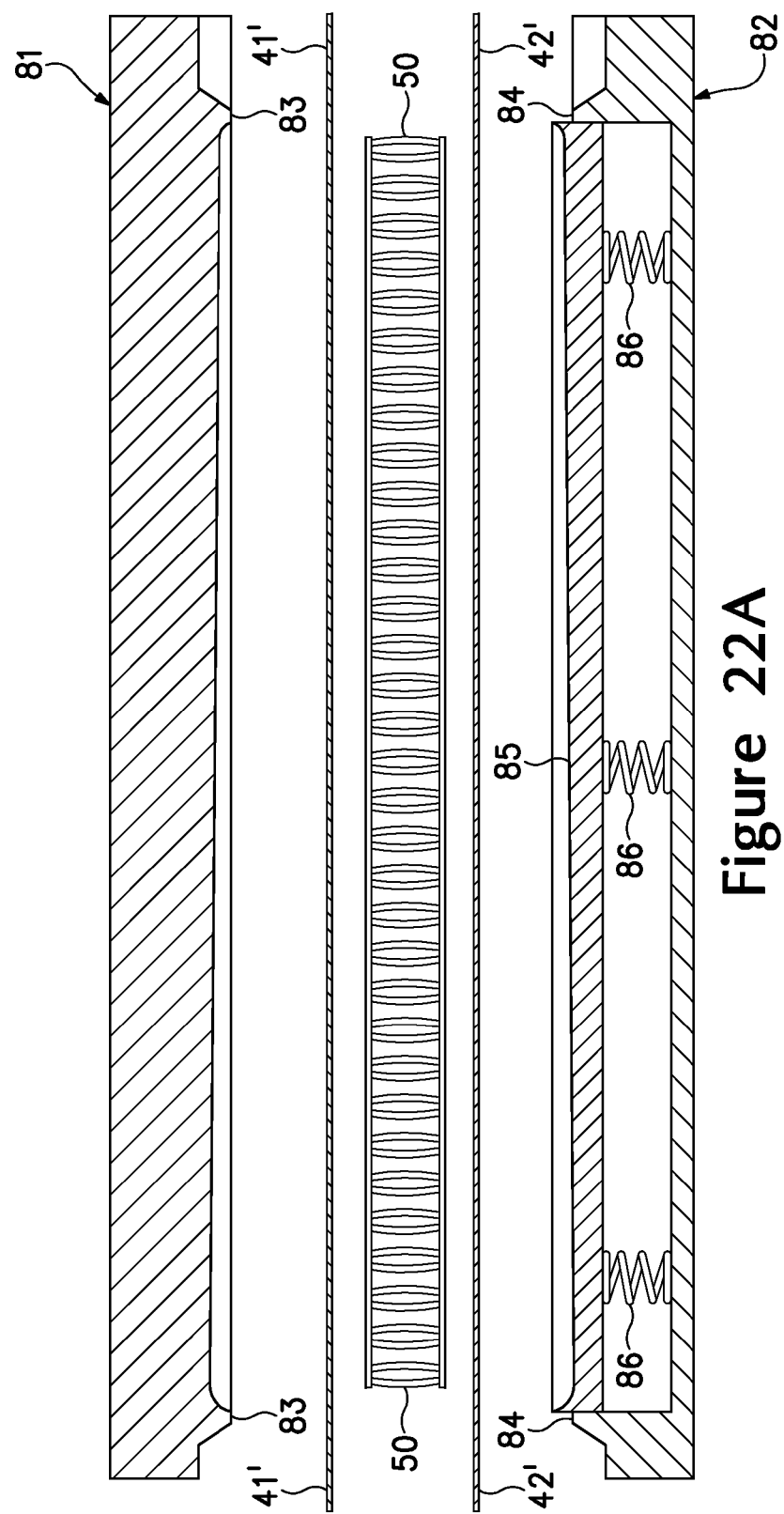
FIGS. 22A-22C are schematic cross-sectional views of the thermoforming apparatus, as defined by section line 22 in FIG. 21, depicting steps in a thermoforming process for the chamber.
Figure 22B:
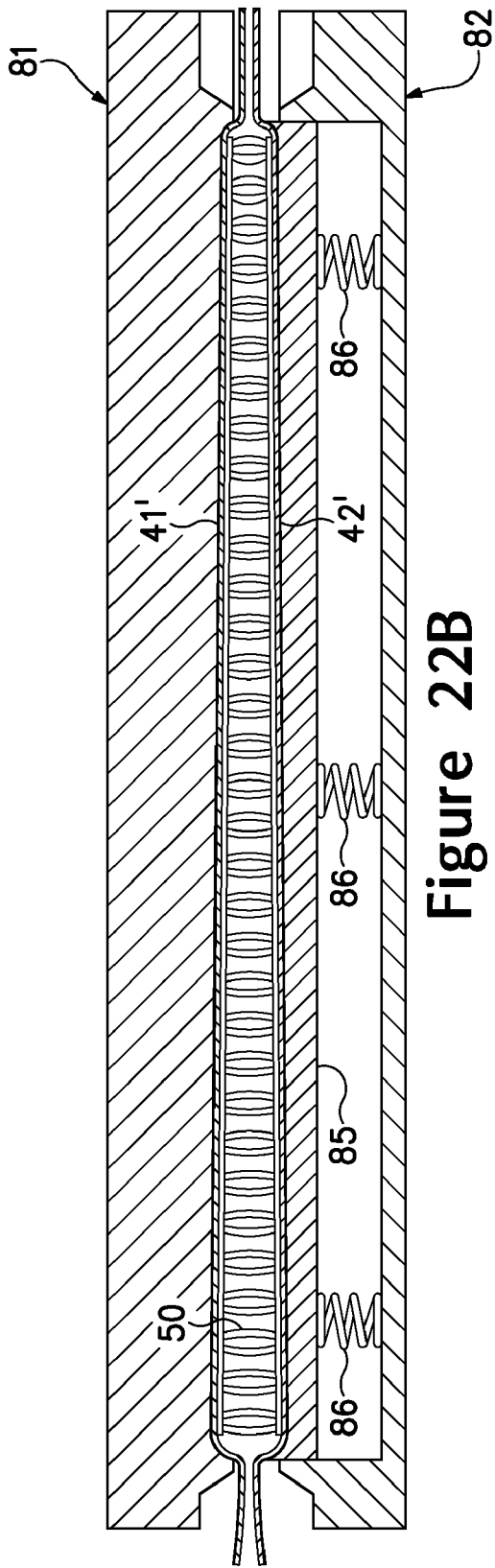

Following heating, the components of chamber 33 are located between mold portions 81 and 82, as depicted in FIG. 22A. In order to properly position the components, a shuttle frame or other device may be utilized. Once positioned, mold portions 81 and 82 translate toward each other and begin to close upon the components such that (a) a ridge 83 of upper mold portion 81 contacts polymer sheet 41', (b) a ridge 84 of lower mold portion 82 contacts polymer sheet 42', and (c) polymer sheets 41' and 42' begin bending around tensile member 50 so as to extend into a cavity within thermoforming apparatus 80, as depicted in FIG. 22B. Accordingly, the components are located relative to thermoforming apparatus 80 and initial shaping and positioning has occurred.

At the stage depicted in FIG. 22B, air may be partially evacuated from the area around polymer sheets 41' and 42' through various vacuum ports in mold portions 81 and 82. The purpose of evacuating the air is to draw polymer sheets 41' and 42' into contact with the various contours of thermoforming apparatus 80. This ensures that polymer sheets 41' and 42' are properly shaped in accordance with the contours of thermoforming apparatus 80. Note that polymer sheets 41' and 42' may stretch in order to extend around tensile member 50 and into thermoforming apparatus 80. In comparison with the thickness of barrier 40 in chamber 33, polymer sheets 41' and 42' may exhibit greater thickness. This difference between the original thicknesses of polymer sheets 41' and 42' and the resulting thickness of barrier 40 may occur as a result of the stretching that occurs during this stage of the thermoforming process.

In order to provide a second means for drawing polymer sheets 41' and 42' into contact with the various contours of thermoforming apparatus 80, the area between polymer sheets 41' and 42' and proximal tensile member 50 may be pressurized. During a preparatory stage of this method, an injection needle may be located between polymer sheets 41' and 42', and the injection needle may be located such that ridges 83 and 84 envelop the injection needle when thermoforming apparatus 80 closes. A gas may then be ejected from the injection needle such that polymer sheets 41' and 42' engage ridges 83 and 84, thereby forming an inflation conduit between polymer sheets 41' and 42'. The gas may then pass through the inflation conduit, thereby entering and pressurizing the area proximal to tensile member 50. In combination with the vacuum, the internal pressure ensures that polymer sheets 41' and 42' contact the various portions of thermoforming apparatus 80.

Figure 22C:
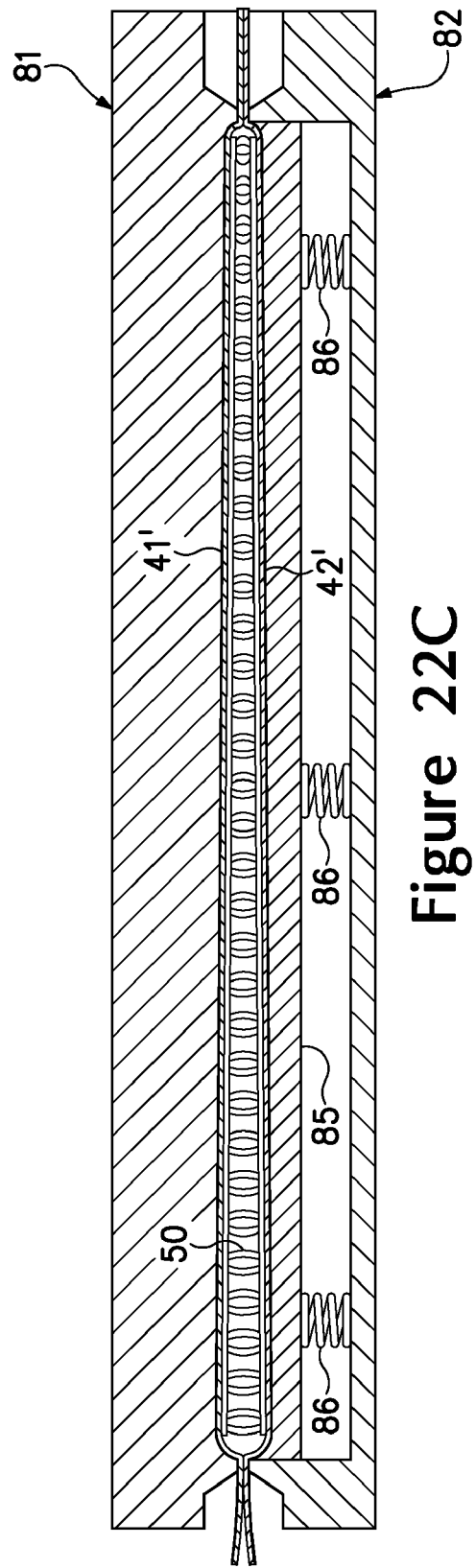

As thermoforming apparatus 80 closes further, ridges 83 and 84 bond polymer sheets 41' and 42' together, as depicted in FIG. 22C, thereby forming peripheral bond 44. In addition, a movable insert 85 that is supported by various springs 86 may depress to place a pressure upon the components, thereby bonding polymer sheets 41' and 42' to tensile member 50. As discussed above, a supplemental layer or thermoplastic threads may be incorporated into tensile member 50 in order to facilitate bonding between tensile member 50 and barrier 40. The pressure exerted upon the components by insert 65 ensures that the supplemental layer or thermoplastic threads form a bond with polymer sheets 41' and 42'.

Surfaces of upper mold portion 81 and of insert 85 are depicted as having a tapered configuration in each of FIGS. 22A-22C. As with spacer 63 discussed above, the tapered configuration of the surfaces may impart different degrees of pressure to different areas of the components forming chamber 33. As an alternative, the use of springs 86 with varying degrees of compressibility may impart different degrees of pressure to different areas of the components forming chamber 33.

As an example, tensile member 50 may initially have a thickness of 13 millimeters when connecting members are in tension. In order to cause bonding of between tensile member 50 and each of polymer sheets 41' and 42', the distance between the surface of insert 85 and the opposing surface of upper mold portion 81 may be 4.45 millimeters (i.e., approximately 0.175 inches). In order to cause bonding and apply sufficient pressure to impart the taper, the distance between the surface of insert 85 and the opposing surface of upper mold portion 81 may be 3.81 millimeters (i.e., approximately 0.150 inches_. Accordingly, a taper of 0.64 centimeters may be sufficient to impart the contouring to chamber 33. Depending upon various factors (e.g., temperature, material properties), a suitable taper may range from 0.05 millimeters to 13 millimeters.

The differences in compression due to the tapering of insert 85 or the use of springs with varying degrees of compressibility effectively shorten the lengths of some of connecting member 53. More particularly, the compression (a) deforms a portion of connecting members 53 or (b) induces polymer material from polymer sheet 41', polymer sheet 42', or the supplemental layers to infiltrate tensile member 50, thereby effectively shortening the lengths of connecting members 53 in the areas where compression are greatest. Depending upon the degree of compression and heat applied to the components, both deformation and infiltration of polymer material may cause the shortening of connecting members 53. Accordingly, differences in compression effectively impart a tapered configuration to tensile member 50.

When bonding is complete, thermoforming apparatus 80 is opened and chamber 33 and excess portions of polymer sheets 41' and 42' are removed and permitted to cool, as depicted in FIG. 23. A fluid may be injected into chamber 33 through the inflation conduit. In addition, a sealing process is utilized to seal the inflation conduit adjacent to chamber 33 after pressurization. The excess portions of polymer sheets 41' and 42' are then removed, thereby completing the manufacture of chamber 33. As an alternative, the order of inflation and removal of excess material may be reversed. As a final step in the process, chamber 33 may be tested and then incorporated into midsole 31 of footwear 10.

Based upon the above discussion, thermoforming apparatus 80 is utilized to (a) impart shape to polymer sheet 41' in order to form upper barrier portion 41 and an upper area of sidewall portion 43, (b) impart shape to polymer sheet 42' in order to form lower barrier portion 42 and a lower area of sidewall barrier portion 43, and (c) form peripheral bond 44 between polymer sheets 41' and 42'. Compressive forces from thermoforming apparatus 80 also (a) bond polymer sheets 41' and 42' to tensile member 50 and (b) effectively shorten the lengths of some of connecting member 53.

Further Configurations

A suitable configuration for a fluid-filled chamber 33 that may be utilized with footwear 10 is depicted in FIGS. 3-9. A variety of other configurations may also be utilized. Referring to FIG. 24A, chamber 33 is depicted as having a configuration that may be utilized in heel region 13. Whereas FIGS. 3-9 depict a configuration that extends from heel region 13 to forefoot region 11, some configurations of chamber 33 may be limited to heel region 13. Similarly, FIG. 24B depicts a configuration of chamber 33 that may be limited to forefoot region 11. In other configurations, chamber 33 may exhibit a lobed structure, as depicted in FIG. 24C.

Figure 25A:
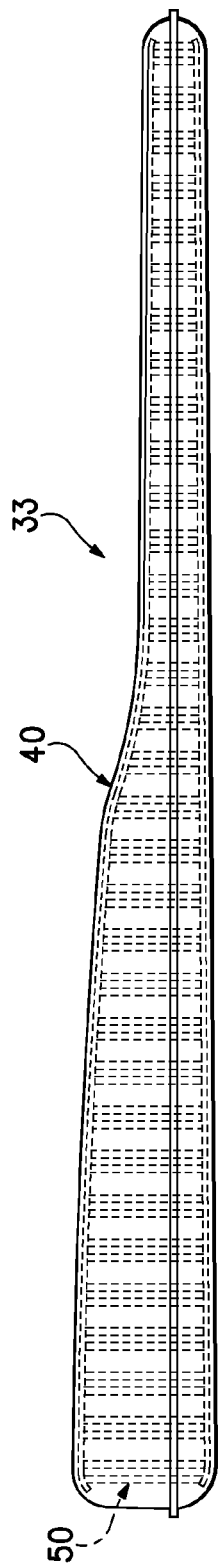
FIGS. 25A-25C are lateral side elevational views corresponding with FIG. 8 and depicting additional configurations of the chamber.
Figure 25B:
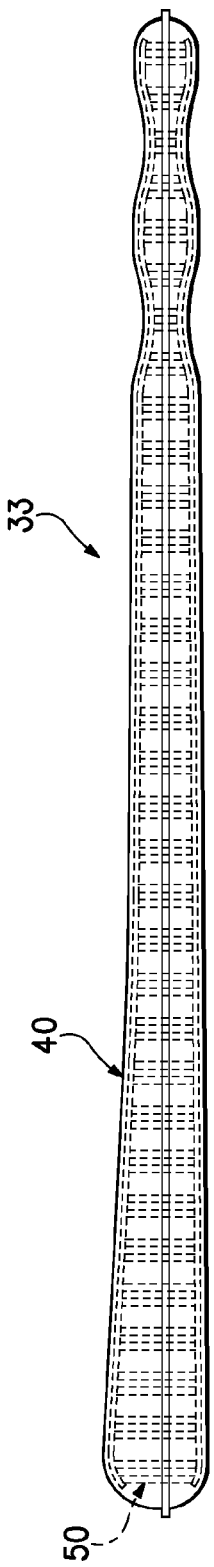
Figure 25C:
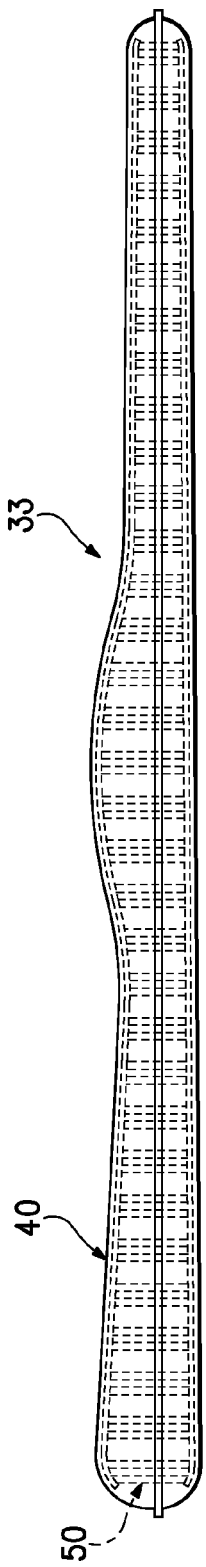

Chamber 33 is discussed above as being tapered between heel region 13 and forefoot region 11. As depicted in FIGS. 7 and 8, for example, the taper is relatively smooth such that the thickness of chamber 33 continually decreases from heel region 13 to forefoot region 11. As an alternative, chamber 33 may be formed to have planar areas in heel region 13 and forefoot region 11, with a transition in midfoot region 12, as depicted in FIG. 25A. In order to enhance the flexibility of chamber 33, tensile member 50 may be formed to have relatively thin areas that form depressions in one or both of barrier portions 41 and 42. For example, chamber 33 is depicted in FIG. 25B as having a pair of depressions in forefoot region 11 that enhance the flexibility of chamber 33 at a location corresponding with metacarpo-phalangeal joints of the foot. In further configurations, tensile member 50 may be compressed in a manner that provides a protrusion in midfoot region 12 for supporting an arch of the foot, as depicted in FIG. 25C.

Figure 26A:
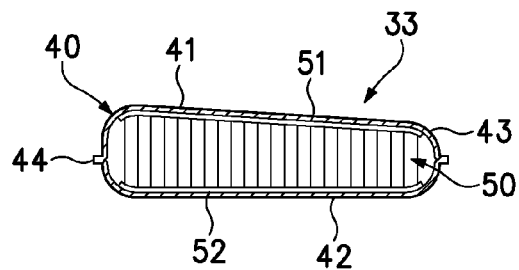
FIGS. 26A-26D are cross-sectional views corresponding with FIG. 6A and depicting additional configurations of the chamber.
Figure 26B:
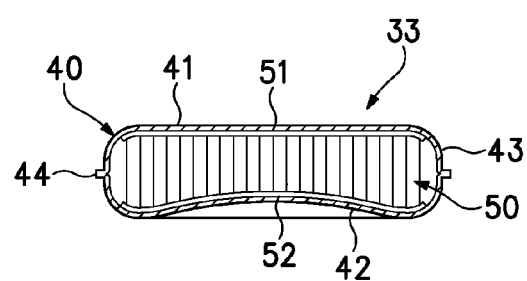
Figure 26C:
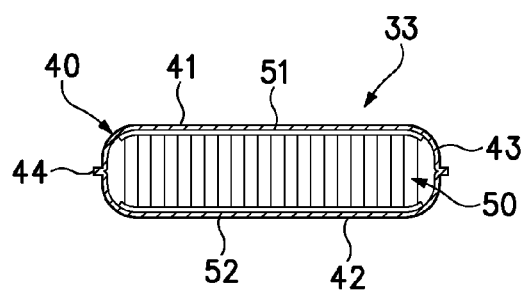

In addition to tapering, upper barrier portion 41 may be contoured to provide support for the foot. For example, connecting members 53 may be shortened to forms a depression in heel region 13 for receiving the heel of the foot, as depicted in FIG. 26A. The depression may also be in lower barrier portion 42, as depicted in FIG. 26B. In order to form depressions or otherwise impart curved contouring to chamber 33, laminating apparatus 60 or thermoforming apparatus 80 may be formed to have curved surfaces. That is, in addition to being planar and non-parallel, surfaces within laminating apparatus 60 and thermoforming apparatus 80 may be curved to impart the non-parallel aspect. In some configurations, chamber 33 may taper between medial side 15 and lateral side 14, as depicted in FIG. 26C. This taper may, for example, reduce the rate at which the foot pronates during running.

Figure 26D:
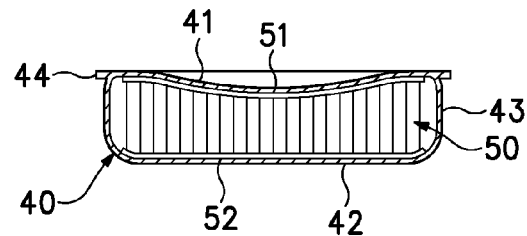

Peripheral bond 44 is depicted as being located between upper barrier portion 41 and lower barrier portion 42. That is, peripheral bond 44 is centered between barrier portions 41 and 42. In other configurations, however, peripheral bond 44 may be located on the same plane as either of barrier portions 41 and 42. As an example, peripheral bond 44 is depicted as being level with upper barrier portion 41 in FIG. 26D. In this configuration, therefore, upper polymer layer 71 is generally limited to forming upper barrier portion 41, whereas lower polymer layer 72 forms both of lower barrier portion 42 and sidewall barrier portion 43. An advantage of this configuration is that visibility through sidewall barrier portion 43 is enhanced when sidewall barrier portion 43 is visible on either of sides 14 and 15 of footwear 10.

Figure 27:
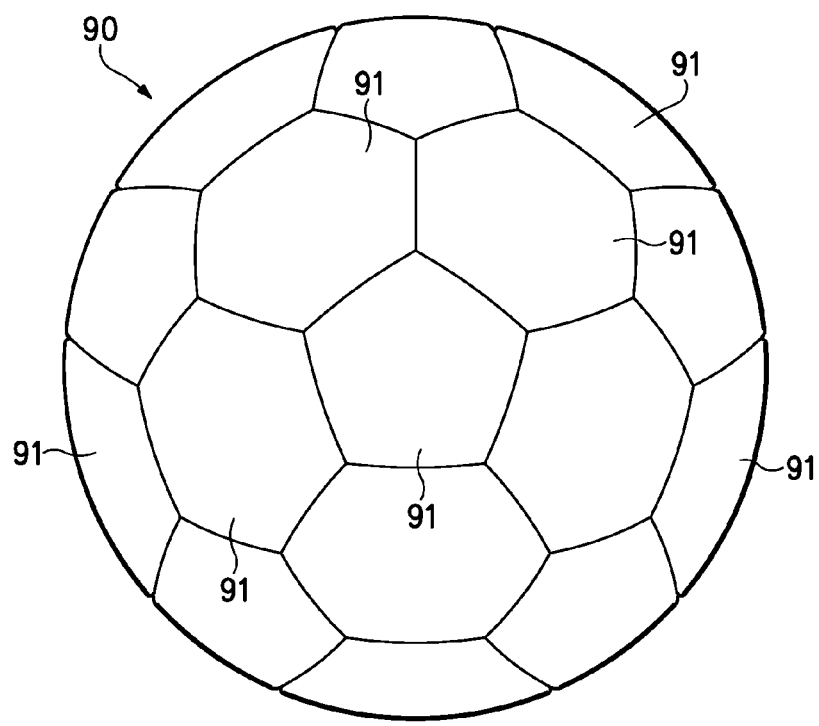
FIG. 27 is an elevational view of a ball incorporating a plurality panels with the configurations of fluid-filled chambers.
Figure 28:
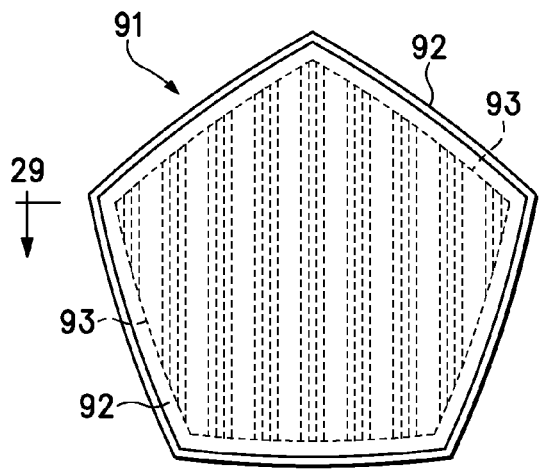
FIG. 28 is a top plan view of one of the panels.
Figure 29:
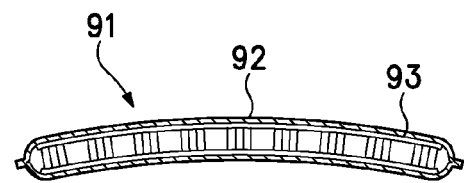
FIG. 29 is a cross-sectional view of the panel, as defined by section line 29-29 in FIG. 28.

Chamber 33 is discussed above as having a configuration that is suitable for footwear. In addition to footwear, chambers having similar configurations may be incorporated into other types of apparel and athletic equipment, including helmets, gloves, and protective padding for sports such as football and hockey. Similar chambers may also be incorporated into cushions and other compressible structures utilized in household goods and industrial products. Referring to FIG. 27, a ball 90 having the configuration of a soccer ball is depicted as including a plurality of pentagonal and hexagonal panels 91. Each of panels 91 have the configuration of a fluid-filled chamber that is similar to chamber 33. More particularly, and with reference to FIGS. 28 and 29, one of panels 91 is depicted as having a barrier 92 and a tensile member 93 located within barrier 92. Each of panels 91 have curved surfaces that combine to form a generally spherical shape for ball 90. In forming each of panels 91 and imparting curved contouring to panels 91, apparatuses similar to laminating apparatus 60 or thermoforming apparatus 80 may be formed to have curved surfaces. That is, in addition to being planar and non-parallel, surfaces within laminating apparatus 60 and thermoforming apparatus 80 may be curved to impart the curved configurations to surfaces of panels 91.

Further Manufacturing Processes

In each of the manufacturing processes discussed above, non-parallel or otherwise contoured apparatuses are utilized to impart contour to chamber 33. More particularly, spacer 63 is secured to lower portion 62 and forms a non-parallel surface with upper portion 61 in laminating apparatus 60, and surfaces of upper mold portion 81 and of insert 85 have a tapered configuration in thermoforming apparatus 80. As an alternative to non-parallel or otherwise contoured apparatuses, other features may be utilized to impart contour to chamber 33.

Figure 30A:
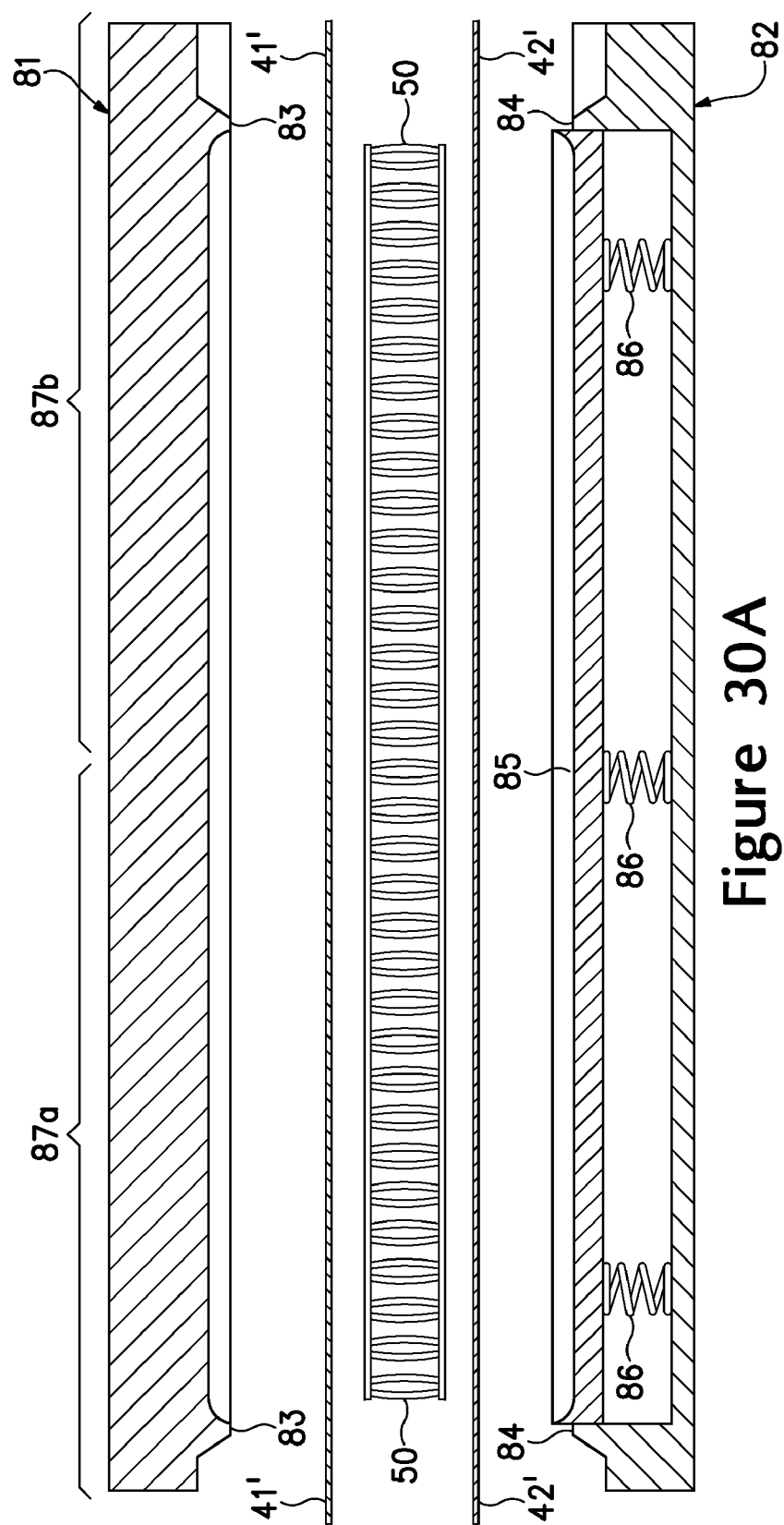
FIGS. 30A and 30B are cross-sectional views corresponding with FIG. 22A and depicting further manufacturing configurations of the thermoforming apparatus and further manufacturing processes.

Another configuration of thermoforming apparatus 80 is depicted in FIG. 30A, wherein surfaces of upper mold portion 81 and of insert 85 have a non-tapered or substantially parallel configuration. For purposes of reference, a first side 87a and a second side 87b are also identified in FIG. 30A. Although surfaces of thermoforming apparatus 80 are non-tapered, contour may be imparted to chamber 33 by heating sides 87a and 87b to different temperatures. In general, areas of thermoforming apparatus 80 with greater temperature will induce a reduced thickness in chamber 33, and areas of thermoforming apparatus 80 with lesser temperature will induce a greater thickness in chamber 33. By heating side 87b to a greater temperature than side 87a, portions of chamber 33 formed in side 87b will have lesser thickness than portions of chamber 33 formed in side 87a. Furthermore, by continuously varying the temperature of thermoforming apparatus 80 between sides 87a and 87b, chamber 33 will be subject to a range of temperatures that may induce the tapered configuration depicted in FIGS. 7 and 8. That is, the temperature may continuously change along the length of thermoforming apparatus 80 in order to induce a gradual change in thickness along the length of chamber 33.

Figure 30B:
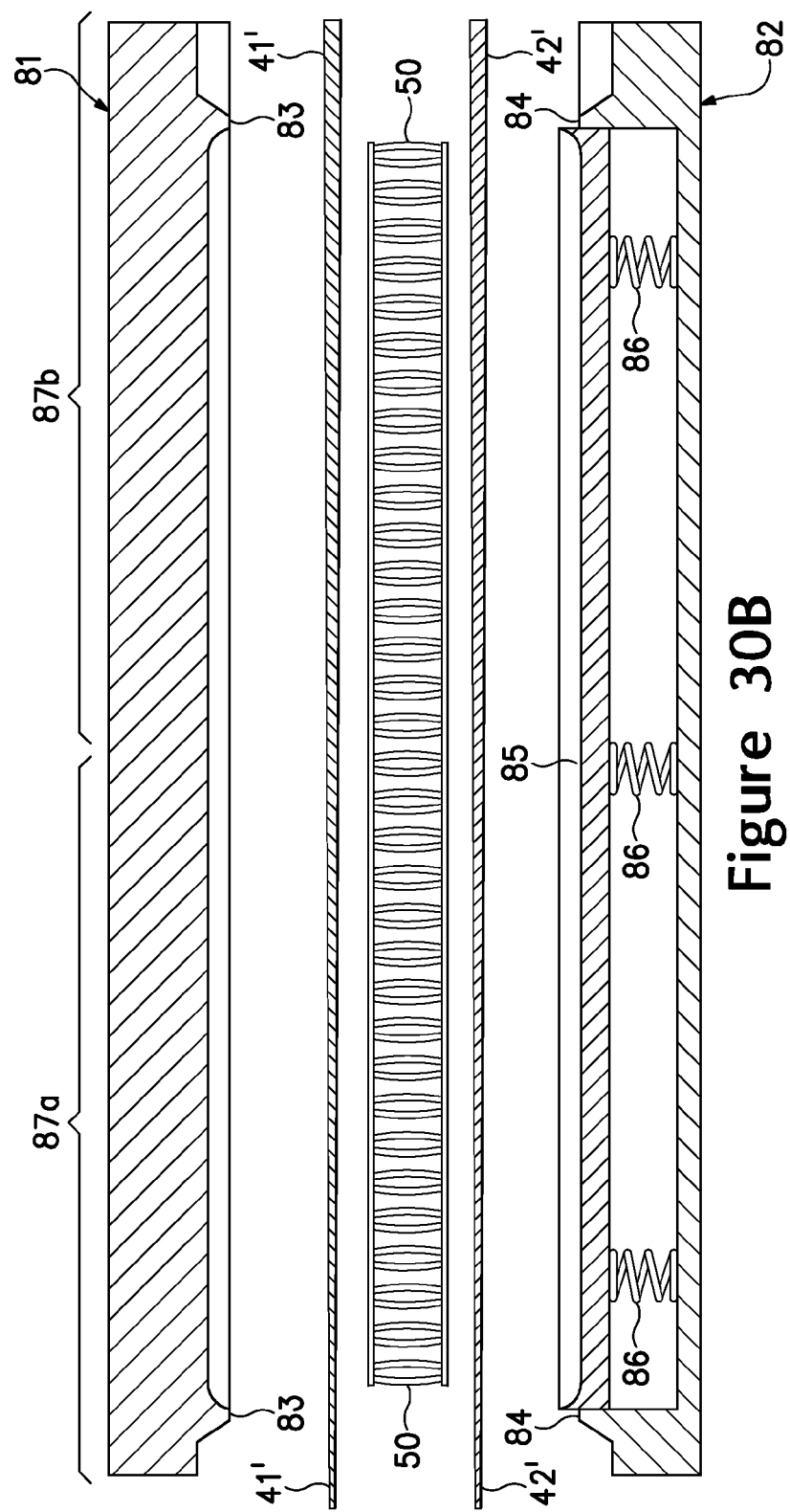

The configuration of thermoforming apparatus 80 wherein surfaces of upper mold portion 81 and of insert 85 have a non-tapered or substantially parallel configuration may also be utilized in another way to impart taper to chamber 33. Referring to FIG. 30B, polymer sheets 41' and 42' are depicted as having tapered configurations. Moreover, portions of polymer sheets 41' and 42' in side 87a are thinner than portions of polymer sheets 41' and 42' in side 87b. As an example, polymer sheets 41' and 42' may taper from 1.10 millimeters (i.e., approximately 0.045 inches) to 1.90 millimeters (i.e., approximately 0.075 inches). In general, areas where polymer sheets 41' and 42' have greater thickness will correspond with areas where chamber 33 exhibits lesser thickness. Accordingly, portions of chamber 33 formed in side 87a will have greater thickness than portions of chamber 33 formed in side 87b. Moreover, the continuous taper in polymer sheets 41' and 42' will induce a continuous taper along the length of chamber 33, as depicted in FIGS. 7 and 8. That is, the thickness of polymer sheets 41' and 42' may continuously change in order to induce a gradual change in thickness along the length of chamber 33.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a fluid-filled chamber, the method comprising:
   locating a textile tensile member between two polymer elements including a first polymer sheet on a first side, a second polymer sheet on a second side;
   the textile tensile member including a first tensile layer and a second tensile layer and a plurality of connecting members extending between the first tensile layer and the second tensile layer;
   applying heat at a first temperature to a first area of the first side of the tensile member and the polymer elements;
   applying heat at a second temperature to a second area of the first side of the tensile member and the polymer elements, the first temperature being greater than the second temperature to impart a non-uniform thickness to the textile tensile member; and
   bonding the polymer elements together around a periphery of the tensile member.

2. The method recited in claim 1, including a step of continuously varying the heat between the first area and the second area.

3. The method recited in claim 1, further including a step of incorporating the chamber into an article of footwear.

4. The method recited in claim 3, further including a step of locating the first area in a forefoot region of the footwear and locating the second area in a heel region of the footwear.

5. The method recited in claim 1, wherein the step of applying heat includes applying heat with radio frequency energy.

6. The method recited in claim 1, further including compressing the tensile member and the polymer elements;
wherein the steps of applying heat at a first temperature, applying heat at a second temperature, and compressing the tensile member and the polymer elements are performed with a laminating apparatus to (a) bond the polymer elements to the tensile layers, (b) decrease a length of at least a portion of the connecting members, and (c) bond the polymer elements together around the periphery of the tensile member.

7. A method of manufacturing a fluid-filled chamber, the method comprising:
locating a textile tensile member between two polymer elements including a first polymer sheet on a first side, a second polymer sheet on a second side;
the textile tensile member including a first tensile layer and a second tensile layer and a plurality of connecting members extending between the first tensile layer and the second tensile layer, the first tensile layer and the second tensile layer being substantially parallel to each other, and the connecting members having substantially uniform lengths;
applying heat at a first temperature to a first area of the first side of the tensile member and the polymer elements;
applying heat at a second temperature to a second area of the first side of the tensile member and the polymer elements, the first temperature being greater than the second temperature to decrease a length of a first portion of the connecting members relative to a length of a second portion of the connecting members; and
bonding the polymer elements together around a periphery of the tensile member.

8. A method of manufacturing a fluid-filled chamber, the method comprising:
locating a textile tensile member between two polymer elements including a first polymer sheet on a first side, a second polymer sheet on a second side;
the textile tensile member including a first tensile layer and a second tensile layer and a plurality of connecting members extending between the first tensile layer and the second tensile layer;
applying heat at a first temperature to a forefoot region of the first side of the tensile member and the polymer elements;
applying heat at a second temperature to a heel region of the first side of the tensile member and the polymer elements, the first temperature being greater than the second temperature to impart a non-uniform thickness to the textile tensile member; and
bonding the polymer elements together around a periphery of the tensile member.

9. The method recited in claim 8, including a step of continuously varying the heat between the forefoot region and the heel region.

* * * * *